(12) United States Patent
Kanai et al.

(10) Patent No.: US 10,116,880 B2
(45) Date of Patent: Oct. 30, 2018

(54) IMAGE STITCHING METHOD AND IMAGE PROCESSING APPARATUS

(71) Applicants: SINTAI OPTICAL (SHENZHEN) CO., LTD., Guang Ming New Zone, ShenZhen, Guandong Province (CN); ASIA OPTICAL CO., INC., Taichung (TW)

(72) Inventors: Kunihiko Kanai, Taichung (TW); Takayuki Sasaki, Taichung (TW); Hiroaki Furuya, Taichung (TW); Takenori Akimoto, Taichung (TW); Gakuji Horigome, Taichung (TW)

(73) Assignees: SINTAI OPTICAL (SHENZHEN) CO., LTD., Shenzhen, Guangdong Province (CN); ASIA OPTICAL CO., INC., Taichung (TW)

( * ) Notice: Subject to any disclaimer, the term of this patent is extended or adjusted under 35 U.S.C. 154(b) by 0 days.

(21) Appl. No.: 15/418,942

(22) Filed: Jan. 30, 2017

(65) Prior Publication Data
US 2017/0230587 A1 Aug. 10, 2017

(30) Foreign Application Priority Data

Feb. 5, 2016 (TW) .............................. 105103993 A
Sep. 29, 2016 (TW) .............................. 105131242 A

(51) Int. Cl.
| | |
|---|---|
| *H04N 5/265* | (2006.01) |
| *H04N 5/232* | (2006.01) |
| *H04N 5/225* | (2006.01) |
| *G02B 13/06* | (2006.01) |

(52) U.S. Cl.
CPC ........... *H04N 5/265* (2013.01); *H04N 5/2252* (2013.01); *H04N 5/2254* (2013.01); *H04N 5/23216* (2013.01); *H04N 5/23293* (2013.01); *G02B 13/06* (2013.01); *G06T 2207/20221* (2013.01)

(58) Field of Classification Search
CPC ........... H04N 5/23216; H04N 5/23293; H04N 5/265; G02B 13/0035; G02B 13/06; G06T 2207/20221
See application file for complete search history.

(56) References Cited

U.S. PATENT DOCUMENTS

| | | | |
|---|---|---|---|
| 2006/0028542 A1* | 2/2006 | Rondinelli | ......... H04N 5/23238 348/36 |
| 2007/0182812 A1* | 8/2007 | Ritchey | ............... H04N 5/2254 348/36 |

* cited by examiner

*Primary Examiner* — Ahmed A Berhan
(74) *Attorney, Agent, or Firm* — McClure, Qualey & Rodack, LLP

(57) ABSTRACT

An image stitching method for use in an image processing apparatus is provided. The method includes the steps of: receiving a first video file and a second video file from an image capturing unit, wherein the first video file includes at least one first image and a first audio track, and the second video file includes at least one second image and a second audio track; calculating delay time between a first acoustic feature of the first audio track and a second acoustic feature of the second audio track to synchronize the first image and the second image; converting the first image and the second image into a first adjusted image and a second adjusted image; and performing an image stitching process on the first adjusted image and the second adjusted image to generate a stitched image.

17 Claims, 29 Drawing Sheets

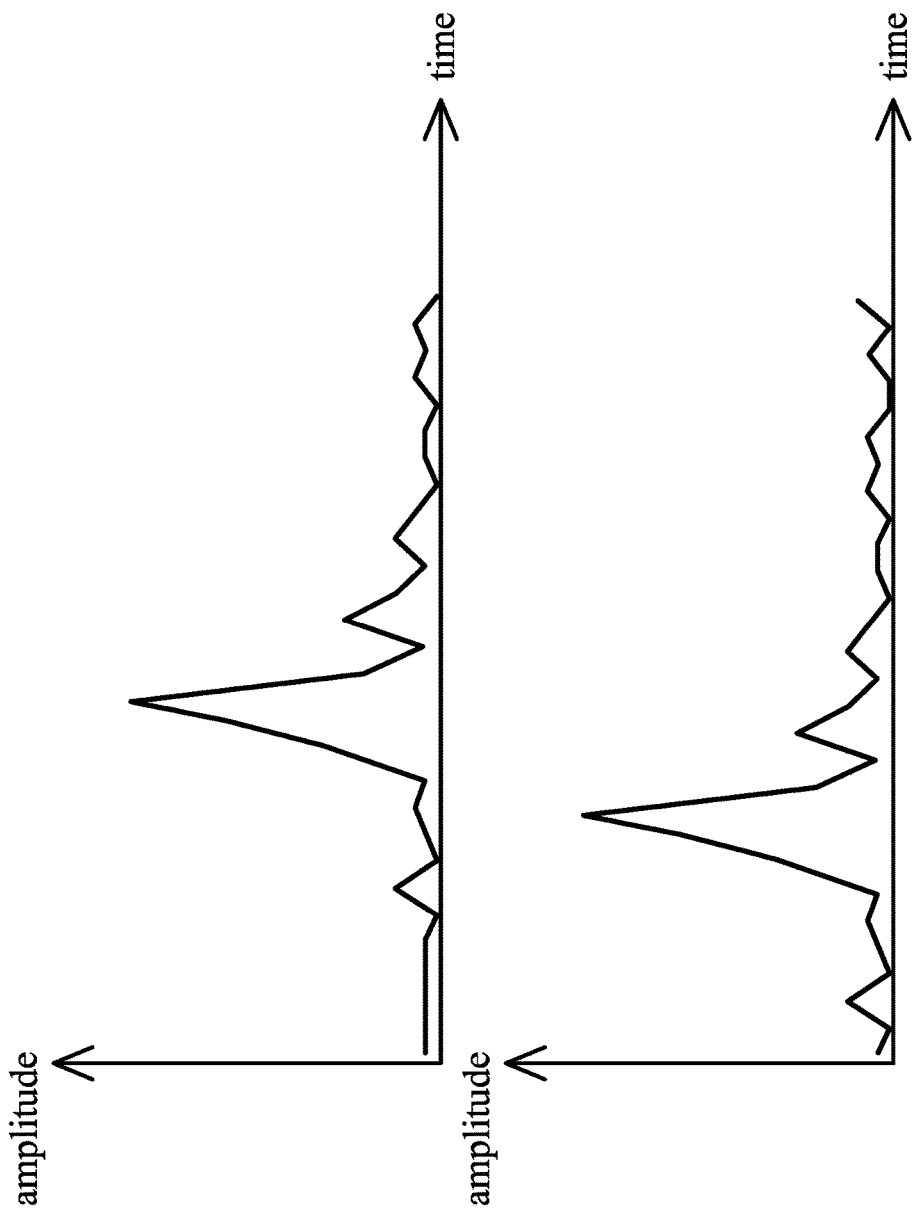

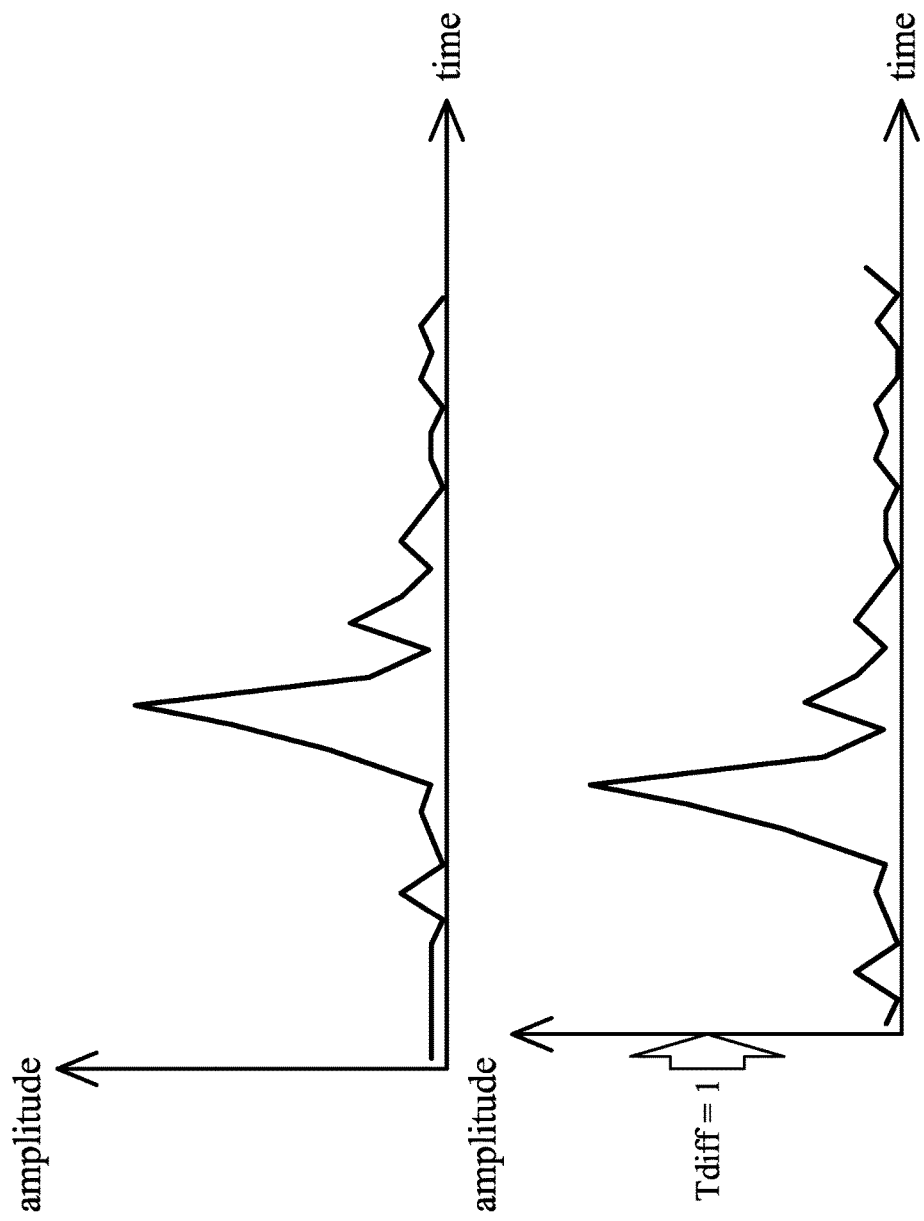

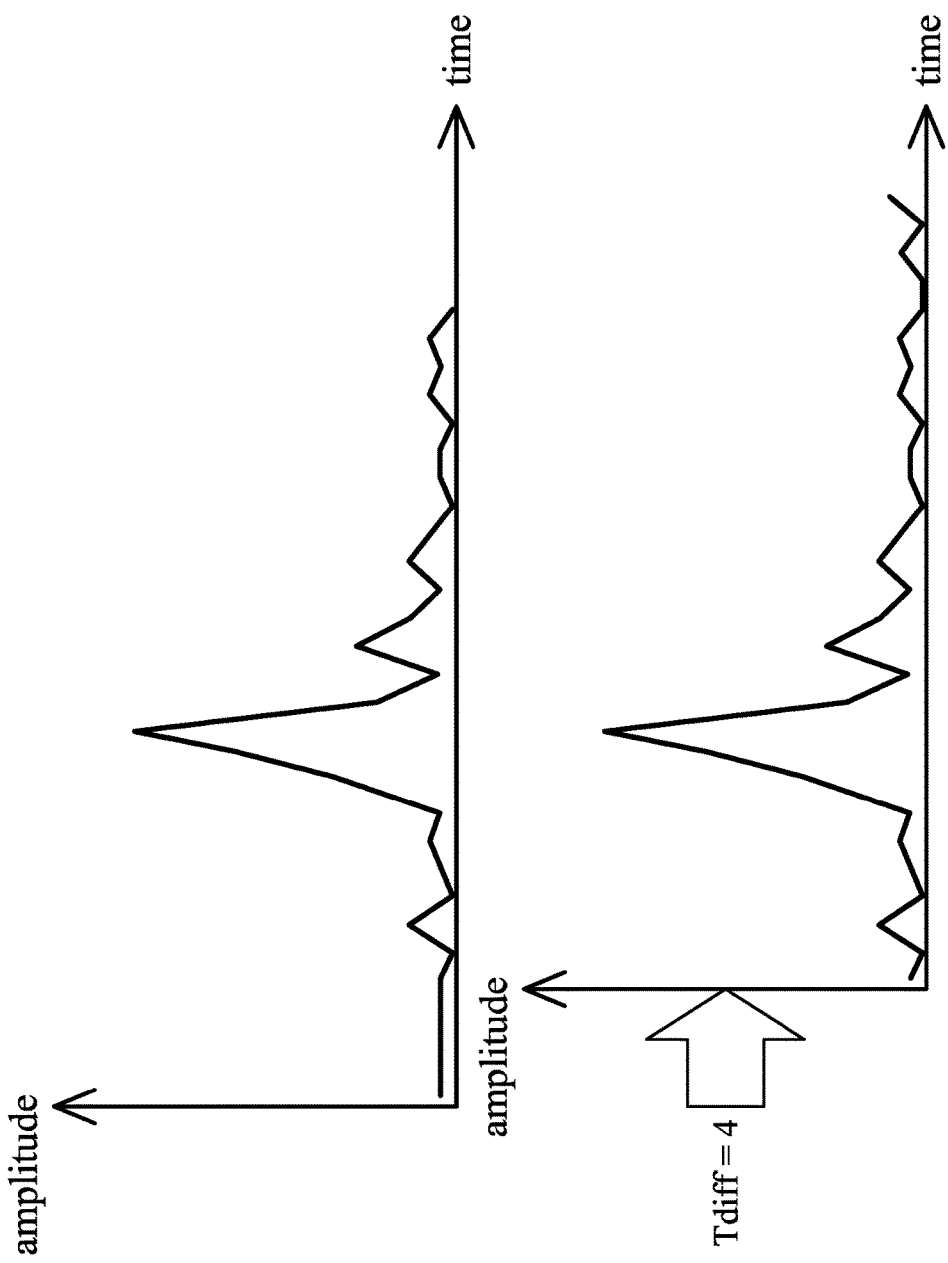

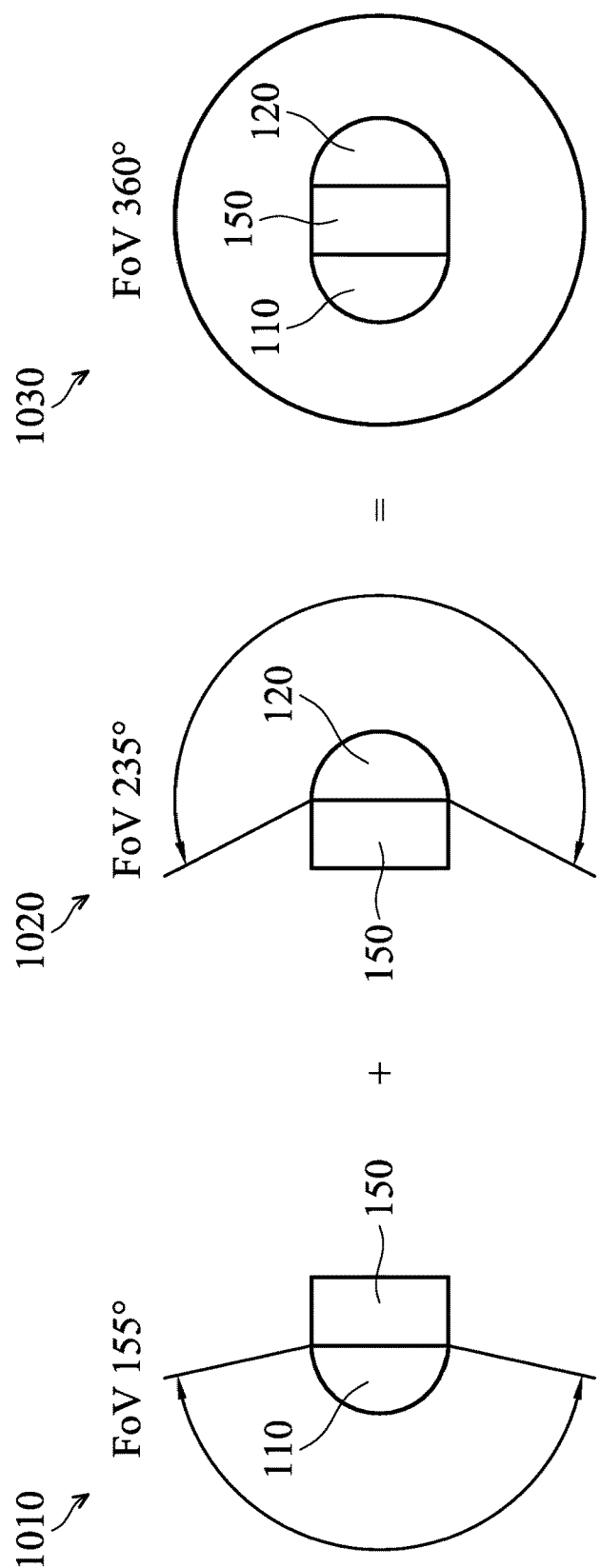

IMAGE STITCHING METHOD AND IMAGE PROCESSING APPARATUS

CROSS REFERENCE TO RELATED APPLICATIONS

This Application claims priority of Taiwan Patent Application No. 105131242, filed on Sep. 29, 2016 and Taiwan Patent Application No. 105103993, filed on Feb. 5, 2016, the entirety of which are incorporated by reference herein.

BACKGROUND OF THE INVENTION

Field of the Invention

The present invention relates to image processing, and, in particular, to an image stitching method and an associated image processing device.

Description of the Related Art

With advances in technology, fisheye lenses are deployed to capture omnidirectional images on many devices, such as drones, unmanned aerial vehicle, selfie sticks, or omnidirectional photography devices. Generally, the omnidirectional photography devices on the market are usually equipped with two fisheye lenses for capturing respective spherical panorama images. However, when performing image stitching on the respective spherical panorama images, conventional image stitching methods and associated programs are usually capable of selecting fixed stitching points, and cannot freely adjust the field of view (FOV) and image effects of the spherical panorama image, resulting in difficult image operations by the user.

Accordingly, there is demand for an image stitching method and an associated image processing device to solve the aforementioned problem.

BRIEF SUMMARY OF THE INVENTION

In an exemplary embodiment, an image stitching method for use in an image processing apparatus is provided. The method includes the steps of: receiving a first video file and a second video file from an image capturing unit, wherein the first video file includes at least one first image and a first audio track, and the second video file includes at least one second image and a second audio track; calculating delay time between a first acoustic feature of the first audio track and a second acoustic feature of the second audio track to synchronize the first image and the second image; converting the first image and the second image into a first adjusted image and a second adjusted image; and performing an image stitching process on the first adjusted image and the second adjusted image to generate a stitched image.

In another exemplary embodiment, an image processing device is provided. The image processing device includes a first lens, a second lens, a memory unit, and a processor. The first lens captures a first image with a first field of view, and the second lens captures a second image with a second field of view, wherein the first field of view is different from the second field of view. The memory unit is for storing a memory stitching program. The processor is for executing the image stitching program to perform the steps of: utilizing the image processing device to receive a first video file and a second video file, wherein the first video file comprises at least one first image and a first audio track, and the second video file comprises at least one second image and a second audio track; calculating delay time between a first acoustic feature of the first audio track and a second acoustic feature of the second audio track and synchronizing the first image and the second image according to the delay time; converting the first image and the second image into a first adjusted image and a second adjusted image, respectively; and performing an image stitching process on the first adjusted image and the second adjusted image to generate a stitched image.

In yet another exemplary embodiment, an image processing device is provided. The image processing device includes a first lens, a second lens, a memory unit, and a processor. The first lens captures a first image with a first field of view, and the second lens captures a second image with a second field of view, wherein the first field of view is different from the second field of view. The memory unit is for storing a memory stitching program. The processor is for executing the image stitching program to perform the steps of: utilizing the image processing device to receive a first video file and a second video file, wherein the first video file comprises at least one first image, and the second video file comprises at least one second image; converting the first image and the second image into a first adjusted image and a second adjusted image, respectively; and performing an image stitching process on the first adjusted image and the second adjusted image to generate a stitched image.

BRIEF DESCRIPTION OF THE DRAWINGS

The present invention can be more fully understood by reading the subsequent detailed description and examples with references made to the accompanying drawings, wherein:

FIGS. 4A~4B are diagrams of the first audio track and the second audio track in accordance with an embodiment of the invention;

FIGS. 4C~4D are diagrams of the first audio track and the second audio track with a timing shift in accordance with an embodiment of the invention;

FIGS. 4E~4F are diagrams of synchronization between the first audio track and the second audio track by shifting the timing in accordance with an embodiment of the invention;

FIG. 10A is a diagram of performing image stitching by the image processing device in accordance with an embodiment of the invention;

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
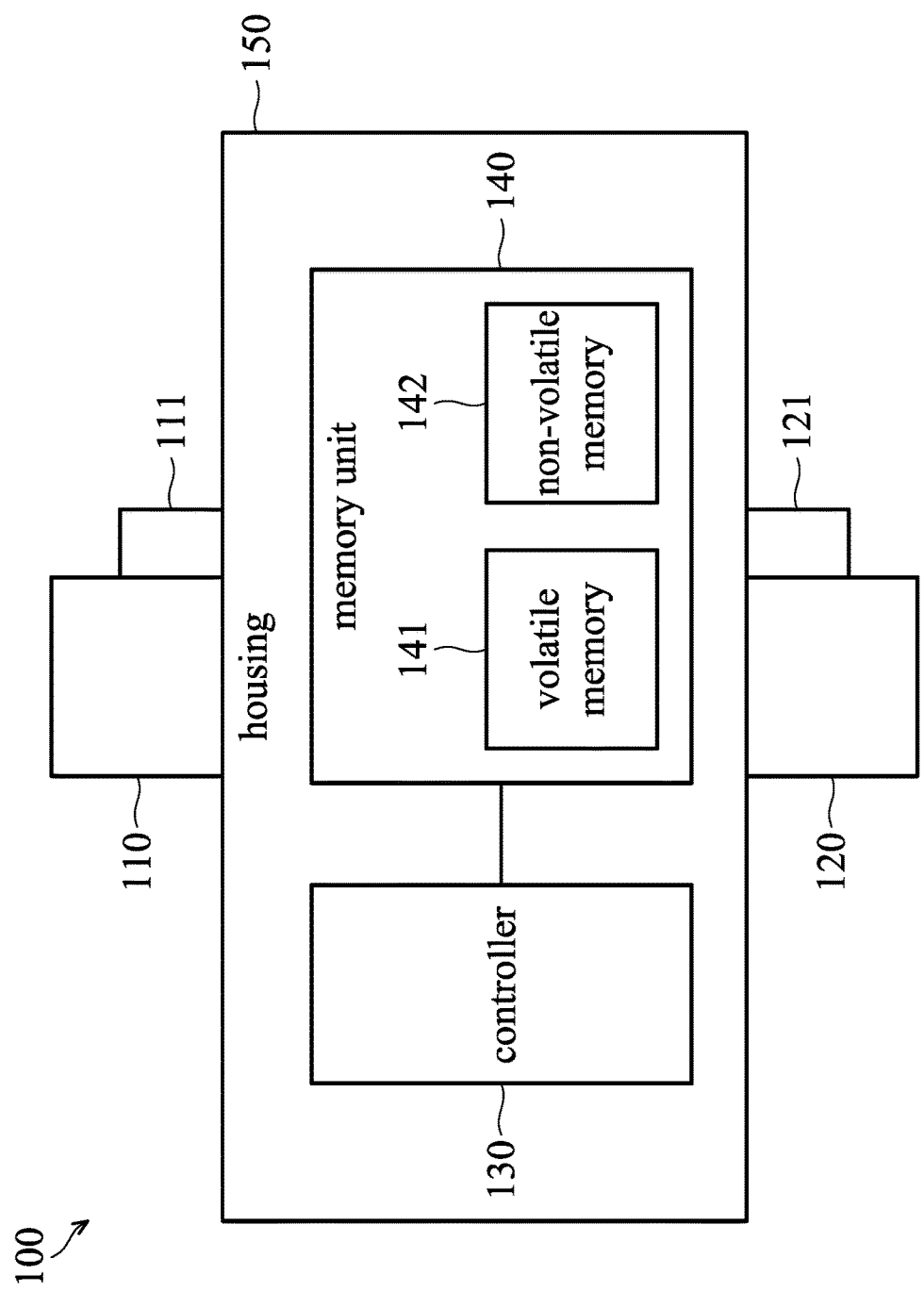
FIG. 1 is a block diagram of an image processing device in accordance with an embodiment of the invention.

FIG. 1 is a block diagram of an image processing device in accordance with an embodiment of the invention. The image processing device 100 includes a first lens 110, a first microphone 111, a second lens 120, a second microphone 121, a controller 130, a memory unit 140, and a housing 150. In an embodiment, the first lens 110 and the second lens 120 are spherical lenses or fisheye lenses for capturing spherical panorama images which are also regarded as 360-degree images. For example, the image processing device 100 can be deployed on a flying drone, a selfie stick, or an omnidirectional photography device, but the invention is not limited thereto. The first microphone 111 and the second microphone 112 are attached on or integrated into the first lens 110 and the second lens 120, and record the audio signal received from the directions, toward which the first lens 110 and the second lens 120 are facing, into a first audio track and a second audio track.

The controller 130 may be a central processing unit (CPU) or a digital signal processor (DSP), or any other equivalent circuit. The memory unit 140 includes a volatile memory 141 and a non-volatile memory 142. For example, the volatile memory 141 may be a static random access memory (SRAM) or a dynamic random access memory (DRAM), and the non-volatile memory 142 may be a hard disk drive, a solid-state disk (SSD), a flash memory, etc., but the invention is not limited thereto. The non-volatile memory 142 stores a video codec program and the controller 130 may reads the video codec program stored in the non-volatile memory 142 to the volatile memory 141 for execution, thereby performing a video encoding process on the captured spherical panorama images and audio tracks. The controller 130 and the memory unit 140 are deployed in the housing 150, and the first lens 110 and the second lens 120 are deployed on opposite surfaces of the housing 150.

For example, the controller 130 may record the first spherical panorama image captured by the first lens 110 and the first audio track captured by the first microphone 111 into a first video file, and record the second spherical panorama image captured by the second lens 120 and the second audio track captured by the second microphone 121 into a second video file. The controller 130 further stores the first video file and the second video file into the non-volatile memory 142, where the first video file and the second video file can be in the MP4 format, but the invention is not limited thereto.

Figure 2:
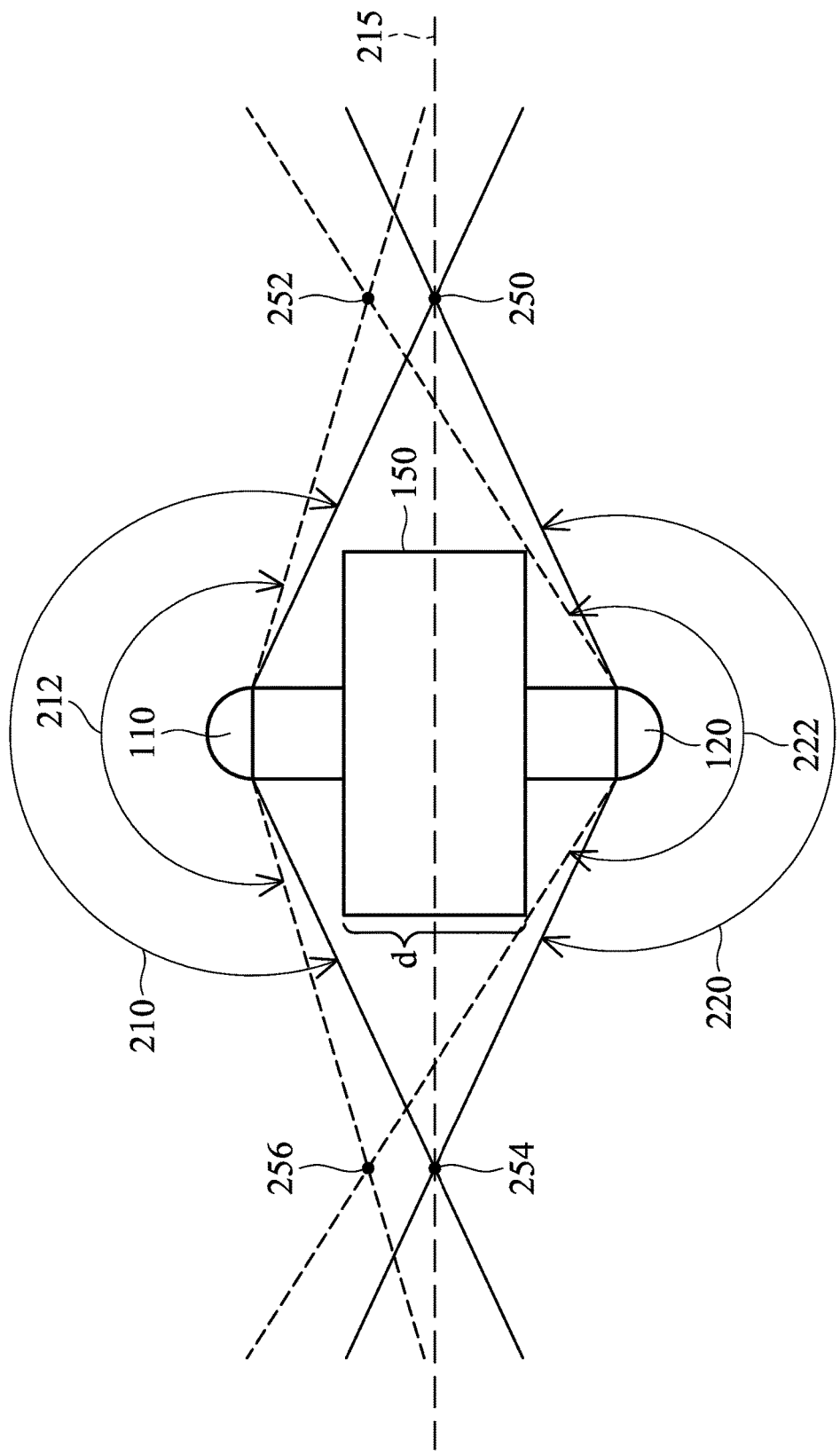
FIG. 2 is a diagram of the image processing device in accordance with an embodiment of the invention.

FIG. 2 is a diagram of the image processing device 100 in accordance with an embodiment of the invention. In an embodiment, the first lens 110 and the second lens 120 are deployed on opposite surfaces of the housing 150, wherein the housing 150 has a predetermined thickness d, as shown in FIG. 2. The thickness d of the housing 150 can be regarded as the parallax between the first lens 110 and the second lens 120. Since the first lens 110 and the second lens 120 are fisheye lens, the angles of depression of the first lens 110 and the second lens 120 can be illustrated by regions 210 and 220, respectively. The stitching points of the first spherical panorama image captured by the first lens 110 and the second spherical panorama image captured by the second lens 120 can be located at locations 250 and 254 on the horizontal center line 215 of the housing 150, where the locations 250 and 254 are the best image stitching points.

However, during installation of the first lens 110 and the second lens 120 on the image processing device 100, the angles of depression of the first lens 110 and the second lens 120 may not totally match the regions 210 and 220. For example, the angles of depression of the first lens 110 and the second lens 120 may be located on regions 212 and 222, and the stitching points of the first spherical panorama image captured by the first lens 110 and the second spherical panorama image captured by the second lens 120 may be shifted to locations 252 and 256 that are not located on the horizontal center line 215 of the housing 150, resulting in a poorer image stitching effect. The image processing device in the invention may automatically determine whether the stitching points of the first spherical panorama image and the second spherical panorama image are located on the horizontal center line 215 of the housing 150. If the stitching points of the first spherical panorama image and the second spherical panorama image are not located on the horizontal center line 215 of the housing 150, the image processing device may further automatically adjust the first spherical panorama image and the second spherical panorama image, so that the stitching points of the adjusted first spherical panorama image and the adjusted second spherical panorama image are located on the horizontal center line 215, thereby obtaining the best image stitching points.

Figure 3:
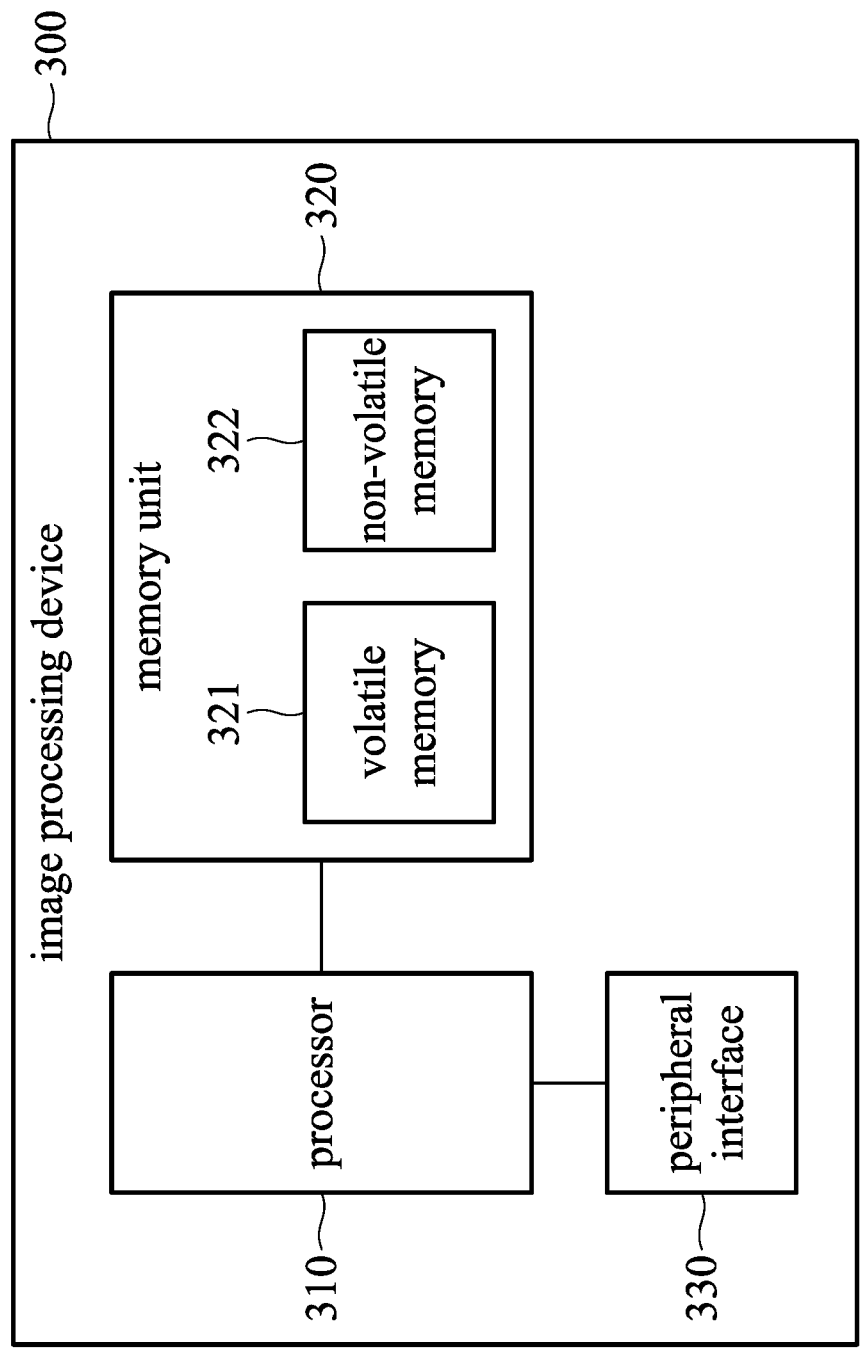
FIG. 3 is a block diagram of the image processing device in accordance with an embodiment of the invention.

FIG. 3 is a block diagram of the image processing device in accordance with an embodiment of the invention. The image processing device 300 may be a personal computer (PC) or a server. The image processing device 300 may include a processor 310, a memory unit 320, and a peripheral interface 330. The memory unit 320 includes a volatile memory 321 and a non-volatile memory 322, wherein the volatile memory 321 may be a static random access memory (SRAM) or a dynamic random access memory (DRAM), and the non-volatile memory 322 may be a hard disk drive, a solid-state disk, or a flash memory, but the invention is not limited thereto. The non-volatile memory 142 stores a video codec program, and the processor 310 reads the video codec program stored in the non-volatile memory 322 to the volatile memory 321 for execution, thereby performing video/audio decoding processes on the first video file and the second video file and performing an image stitching process on the spherical panorama images obtained from the video decoding process. In the following sections, the details of the image stitching process will be described. The peripheral interface 330 includes a multimedia interface (e.g. a high-definition multimedia interface (HDMI)), a data transmission interface (e.g. USB, SATA interface, etc.), and/or a network transmission interface (e.g. LAN, Wifi, Bluetooth, etc.), and the processor 310 may obtain the first video file and the second video file from the image processing device 100 via the peripheral interface 330.

FIGS. 4A~4B are diagrams of the first audio track and the second audio track in accordance with an embodiment of the invention. FIGS. 4C~4D are diagrams of the first audio track and the second audio track with a timing shift in accordance with an embodiment of the invention. FIGS. 4E~4F are diagrams of synchronization between the first audio track and the second audio track by shifting the timing in accordance with an embodiment of the invention. Referring to FIG. 3 and FIGS. 4A~4B, since the locations of the first lens 110 and the second lens 120 differ slightly, the timing of the first audio track captured by the first microphone 111 and the timing of the second audio track captured by the second microphone 121 also differ. For example, the first audio track captured by the first microphone 111 is illustrated in FIG. 4A, and the second audio track captured by the second microphone 121 is illustrated in FIG. 4B, where the waveform of the first audio track is similar to that of the second audio track with a slight timing offset. Specifically, the processor 310 performs video and audio decoding processes on the first video file and the second video file to obtain the first and second spherical panorama images, and first and second audio tracks, respectively.

First, the processor 310 compares the original first audio track with the original second audio track to obtain a first comparison score, where the timing offset Tdiff of the original first audio track and the original first audio track is 0. Then, the processor 310 performs a delay process (e.g. delay the second audio track by 1 ms, i.e. Tdiff=1 ms) on the original second audio track, and compares the original first track (shown in FIG. 4C) with the delayed second audio track (shown in FIG. 4D) to obtain a second comparison score. Similarly, the processor 310 may gradually increase the delay time (i.e. timing offset) of the original second audio track within a predetermined range and obtain comparison scores with different timing offsets.

Subsequently, the processor 310 determines the timing offset Tdiff that has the highest comparison score (i.e. has the highest similarity), and set the timing offset as the base for time-shifting the second audio track and the second spherical panorama image. For example, when the timing offset Tdiff=4 ms, as shown in FIGS. 4E and 4F, it has the highest comparison score. It should be noted that the method for determining the timing offset are for purposes of description, and timing offset with the highest comparison score can be used for synchronization between the first spherical panorama image and the second spherical panorama image and for a subsequent image stitching process.

Figure 5B:
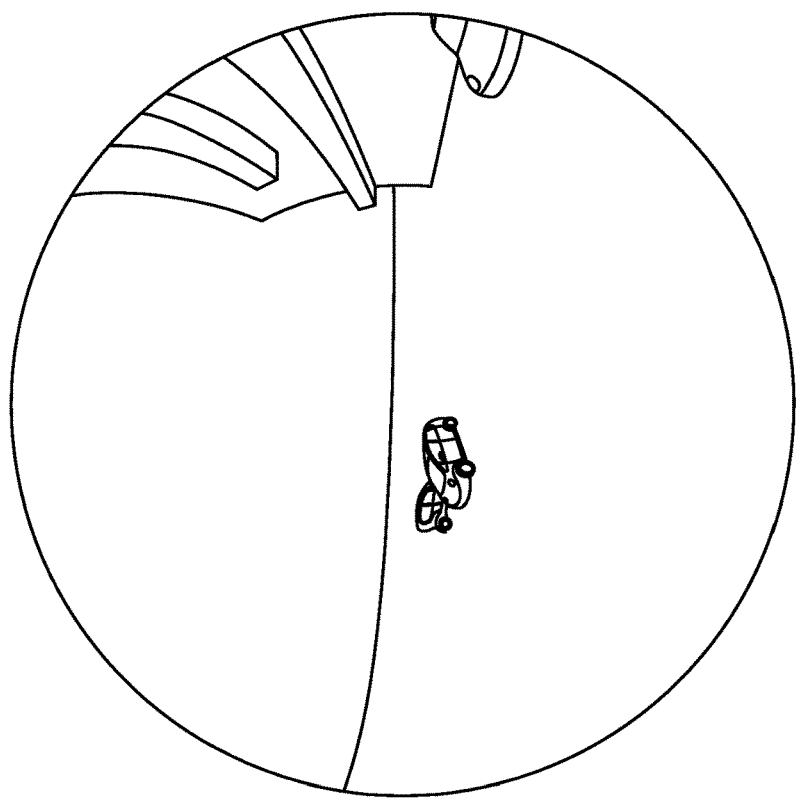
FIG. 5B is a diagram of the first image obtained from the equirectangular projection on the first spherical panorama image.
Figure 5A:
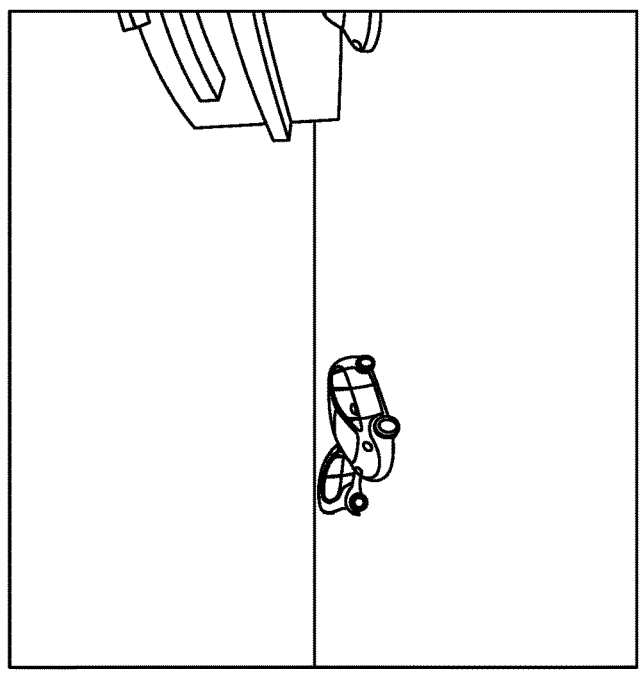
FIG. 5A is a diagram of the first spherical panorama image in accordance with an embodiment of the invention.

Before performing the image stitching process, the processor 310 may use equivalent projection techniques such as equirectangular projection techniques to project the first spherical panorama image and the second spherical panorama image into a first image and a second image that are rectangular images. For example, FIG. 5A is a diagram of the first spherical panorama image in accordance with an embodiment of the invention, and FIG. 5B is a diagram of the first image obtained from the equirectangular projection on the first spherical panorama image. The horizontal edges of the first image in FIG. 5B indicate a range between −90~90 degrees in the horizontal direction of the first spherical panorama image, and the vertical edges of the first image indicate a range between −90~90 degrees in the vertical direction of the first spherical panorama image.

Figure 5C:
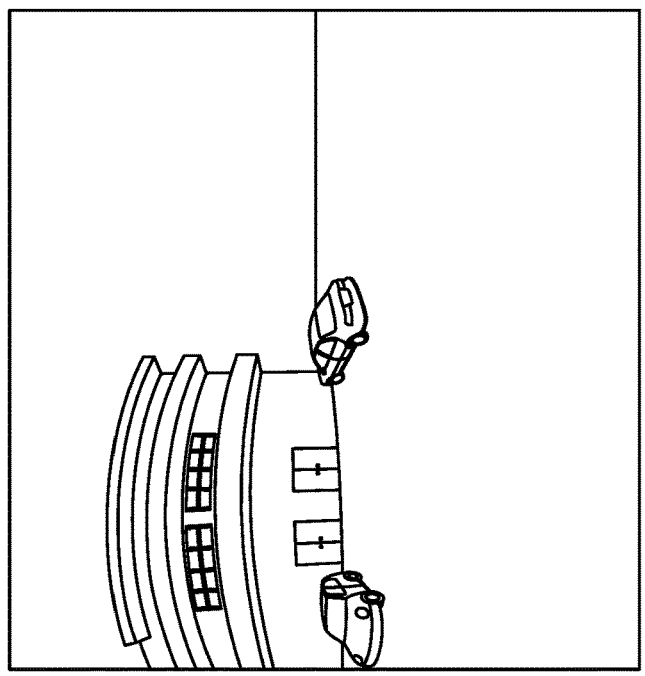
FIG. 5C is a diagram of the second spherical panorama image in accordance with an embodiment of the invention
Figure 5D:
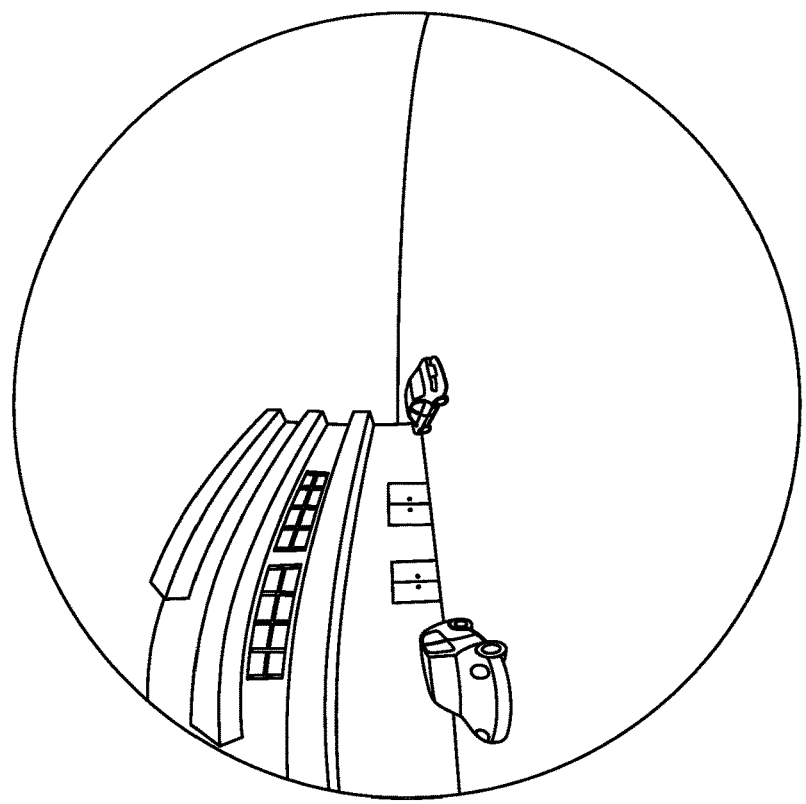
FIG. 5D is a diagram of the second image obtained from the equirectangular projection on the second spherical panorama image.
Figure 5E:
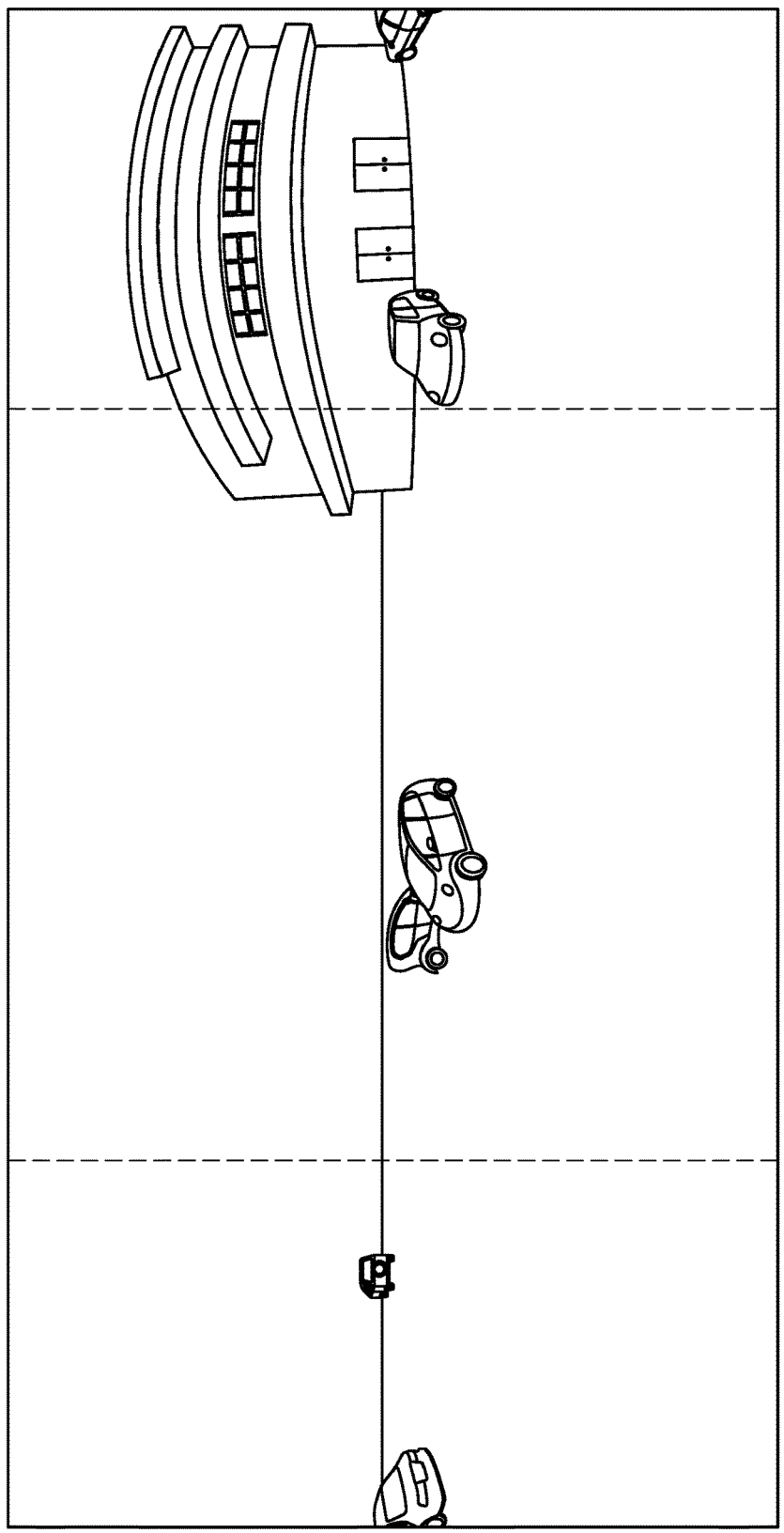
FIG. 5E is a diagram of a stitched image according to FIG. 5B and FIG. 5D.

FIG. 5C is a diagram of the second spherical panorama image in accordance with an embodiment of the invention, and FIG. 5D is a diagram of the second image obtained from the equirectangular projection on the second spherical panorama image. Similarly, the horizontal edges of the second image in FIG. 5C indicate a range between −90~90 degrees in the horizontal direction of the second spherical panorama image, and the vertical edges of the second image indicate a range between −90~90 degrees in the vertical direction of the second spherical panorama image. The processor 310 may place the first image in the center, stitch the right half portion of the second image with the left edge of the first image, and stitch the left half portion of the second image with the right edge of the first image, thereby generating the stitched image, as shown in FIG. 5E. The horizontal edges of the stitched image in FIG. 5E indicate a range between −180~180 degrees in the horizontal direction, and the vertical edges of the stitched image in FIG. 5E indicate a range between −180~180 degrees in the vertical direction.

In some embodiments, exposure values and white-balance processes of the first spherical panorama image and the second spherical panorama image captured by the first lens 110 and the second lens 120 may differ. Accordingly, the processor 310 performs color compensation on the first image and the second image before performing the image stitching process, so that the colors of the first image and the second image become more natural.

Figure 6:
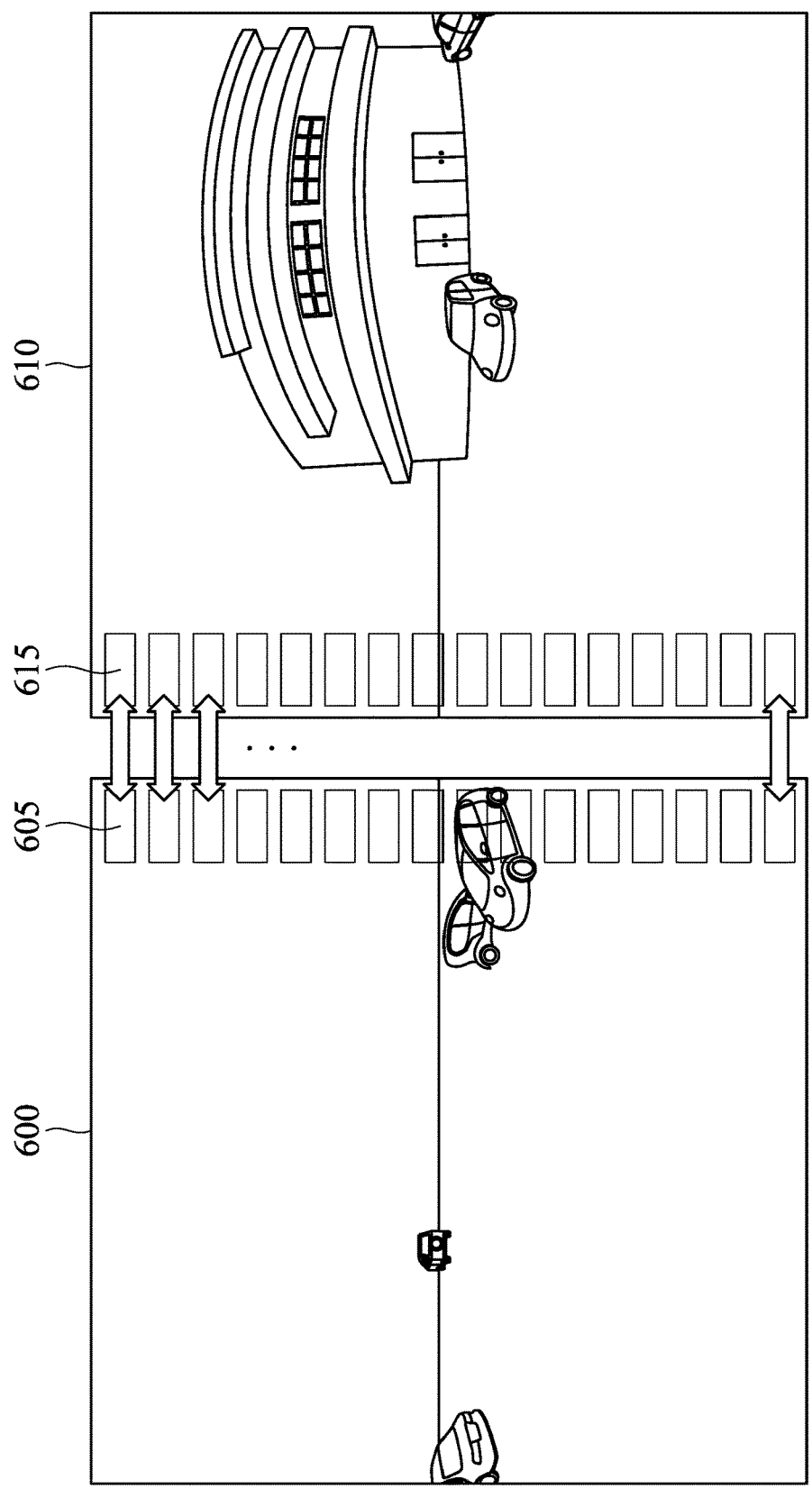
FIG. 6 is a diagram of the first image and the second image before color compensation in accordance with an embodiment of the invention.

FIG. 6 is a diagram of the first image 600 and the second image 610 before color compensation in accordance with an embodiment of the invention. As shown in FIG. 6, block 605 on the right side of first image 600 and block 615 on the left side of the second image 610 indicate the overlapped region in the stitched image. Generally, block 605 and the corresponding block 615 are the same color, and thus the image stitching algorithm performed by the processor 310 may calculate the color compensation coefficients of the first image 600 and the second image 610 according to the color differences between the blocks 605 and 615.

In addition, if the difference between the average color value in block 605 and that in block 615 is very large, it may indicate that the images in blocks 605 and 615 differ due to parallax. Accordingly, the processor 310 may ignore the color difference. It should be noted that the color compensation process performed by the processor 310 is calculated in a linear space. For example, a de-gamma compensation process can be performed before performing the color compensation process followed by a gamma compensation process.

Figure 7A:
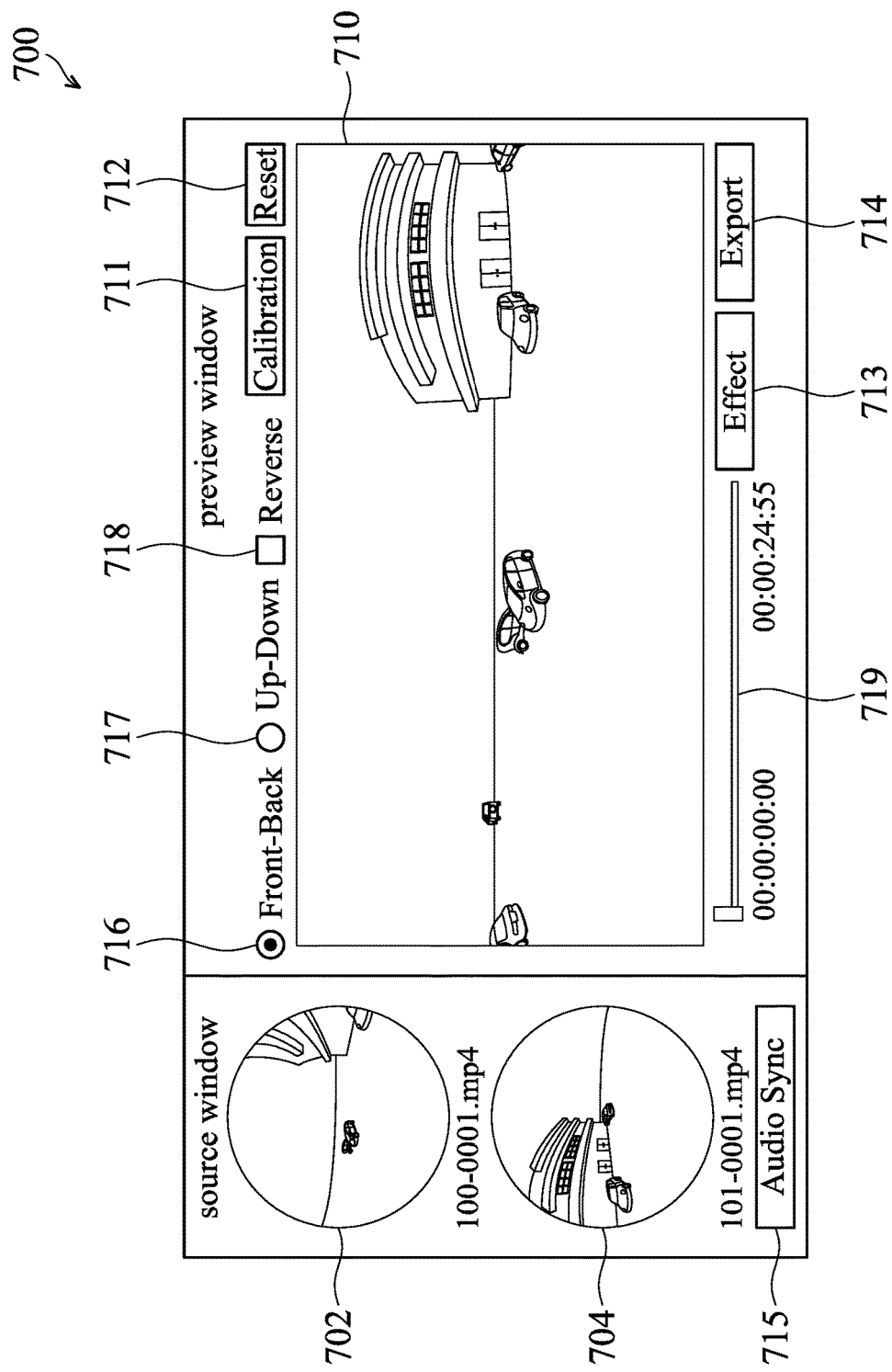
FIGS. 7A~7C are diagrams of a user interface of the image stitching program in accordance with an embodiment of the invention.
Figure 7B:
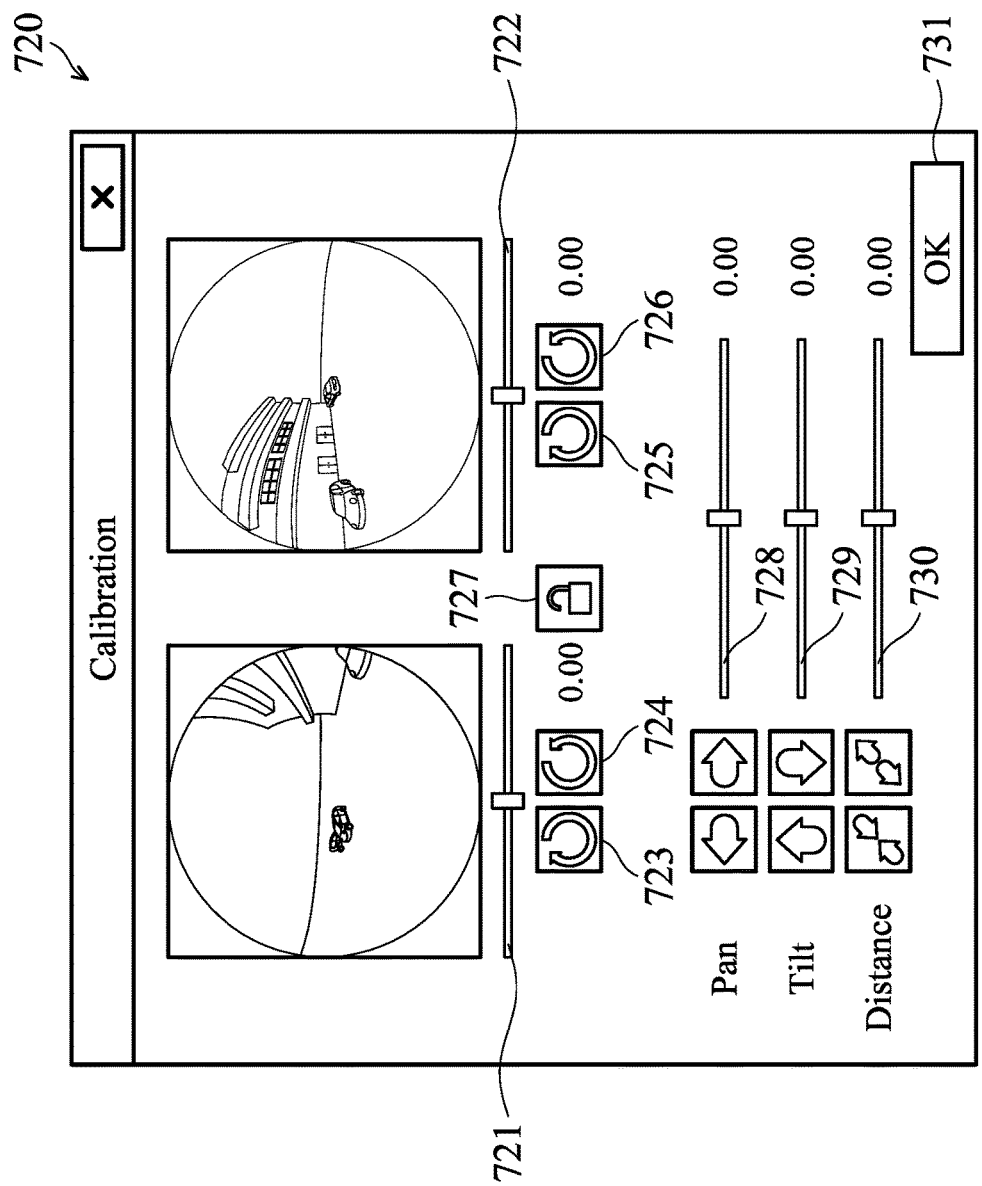
Figure 7C:
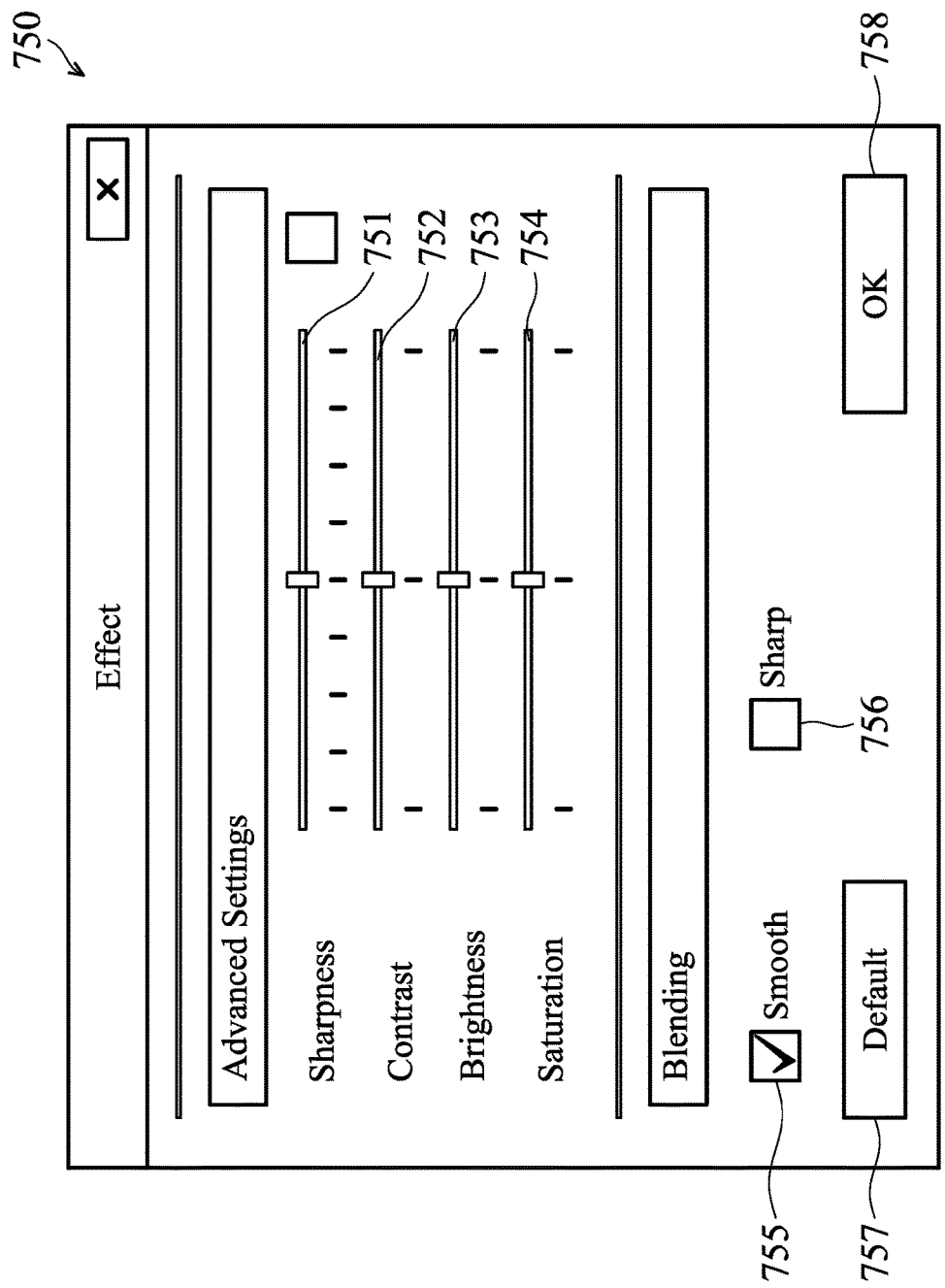

FIGS. 7A~7C are diagrams of a user interface of the image stitching program in accordance with an embodiment of the invention. As shown in FIG. 7A, preview images of the first video file and the second video file read by the processor 310 are displayed on the left side of the user interface 700, and the preview image 710 of the stitched image is shown on the right side of the user interface 700. It should be noted that the frame rates of the first video file and the second video file should be the same for image stitching.

The user interface 700 includes an adjustment button 711, a reset button 712, an image effect button 713, an export button 714, an "audio sync" button 715, and option buttons for adjusting the lenses. For example, the option button 716 is "front-back", the option button 717 is "up-down", and the option button 718 is "reverse". When the user presses the option button 718, the first spherical panorama image and the second spherical panorama image captured by the first lens 110 and the second lens 120 are reversed. If the user presses the "audio sync" button 715, the image stitching program will automatically adjust the output of video images according to the features of the audio signals, where the details can be found in the aforementioned embodiments. When the user presses the "adjustment" button 711, the processor 310 displays a user interface 720 for adjusting the first video file and the second video file, where the user interface 720 is shown in FIG. 7B.

For example, the user interface 720 in FIG. 7B includes searching bars 721 and 722, rotation buttons 723~726, a lock button 727, a pan bar 728, a tilt bar 729, a distance bar 730, and a confirmation button 731. The user may directly press on the searching bars 721 and 722 to select the video time of the first video file and the second video file for image previewing. The rotation buttons 723 and 724 may control the first spherical panorama image 702 to rotate counterclockwise or clockwise, and the rotation buttons 725 and 726 may control the second spherical panorama image 704 to rotate counterclockwise and clockwise. When the user press the lock button 727, the operations for the first video file and the second video file are performed synchronously.

When the user press the image effect button 713, the image stitching program will display a user interface 750, as shown in FIG. 7C, to adjust image effects. The user interface 750 includes a sharpness bar 751, a contrast bar 752, a brightness bar 753, a saturation bar 754, color blending options 755 and 756, a default button 757, and a confirmation button 758. For example, option 755 is for image smoothing, and option 756 is for image sharpening.

Figure 7E:
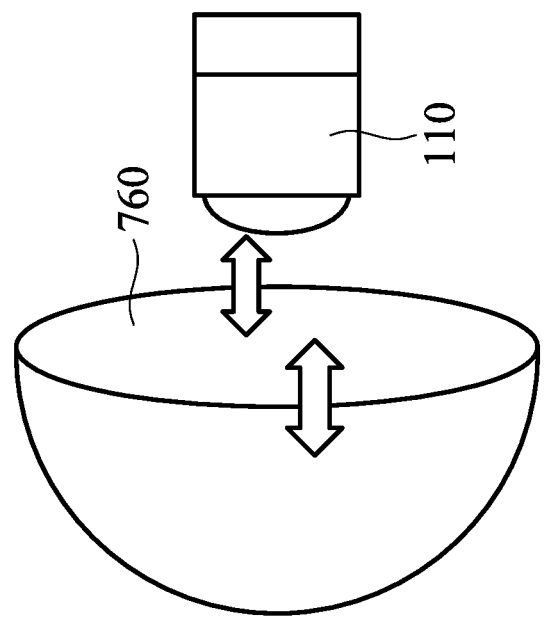
FIGS. 7D~7E are diagrams of the user interface for controlling rotation of the lenses in accordance with an embodiment of the invention.
Figure 7D:
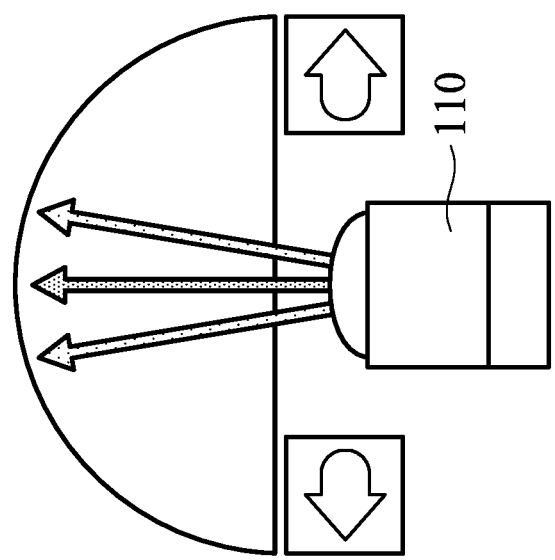

FIGS. 7D~7E are diagrams of the user interface for controlling rotation of the lenses in accordance with an embodiment of the invention. FIG. 7D is a top view of the first lens 110. When the user adjusts the pan bar 728 in FIG. 7B, the first lens 110 will be panned within a predetermined range (e.g. from −10~+10 degree), and the panning of the corresponding first spherical panorama image 760 is shown in FIG. 7E. The second lens 120 can also be panned by a similar adjustment on the pan bar 728.

Figure 7F:
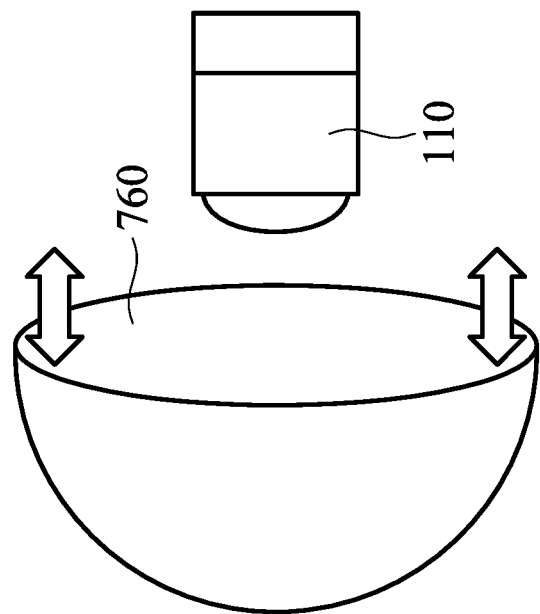
FIGS. 7F and 7G are diagrams of the user interface for controlling tilting of the lenses in accordance with an embodiment of the invention.
Figure 7G:
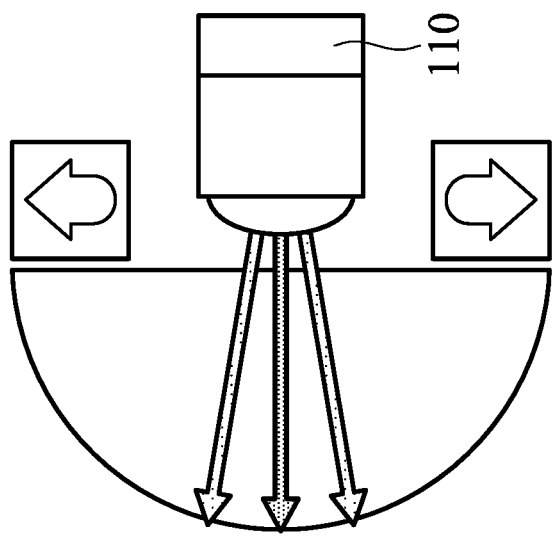

FIGS. 7F and 7G are diagrams of the user interface for controlling tilting of the lenses in accordance with an embodiment of the invention. FIG. 7F is a side view of the first lens 110. When the user adjusts the tilt bar 729, the tilt angle of the first lens 110 will be adjusted within a predetermined range (e.g. −10~+10 degree), and the tilting of the corresponding first spherical panorama image 760 is shown in FIG. 7G. The second lens 120 can also be tilted by a similar adjustment on the tilt bar 729.

Figure 7I:
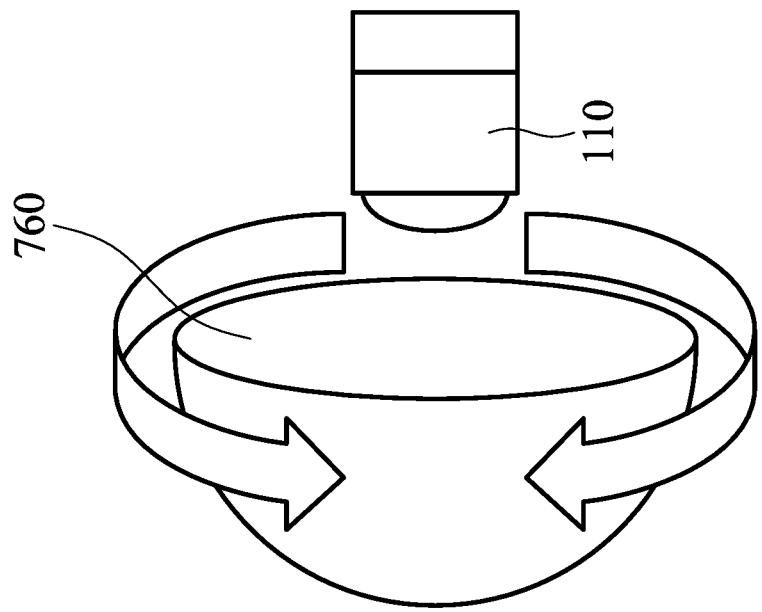
FIGS. 7H, 7I, and 7J are diagrams of the user interface for controlling rotation of lenses in the embodiment of FIG. 7B.
Figure 7H:
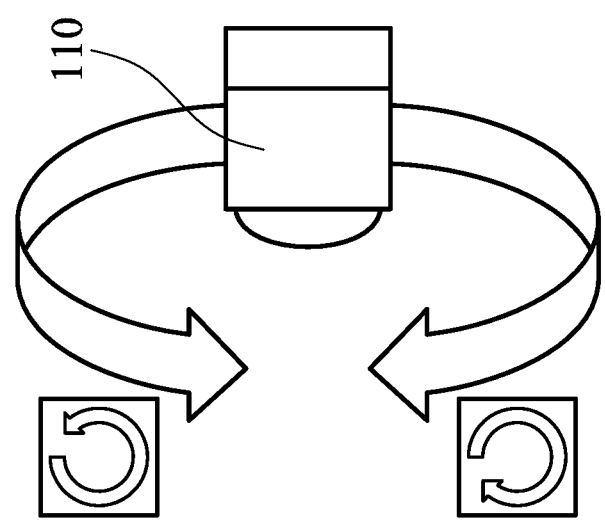
Figure 7J:
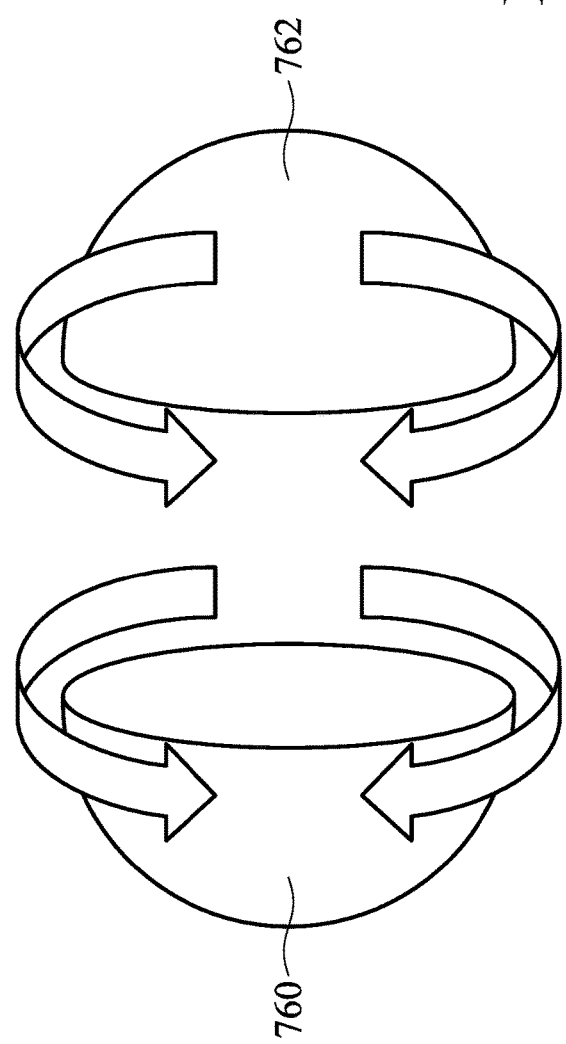

FIGS. 7H, 7I, and 7J are diagrams of the user interface for controlling rotation of lenses in the embodiment of FIG. 7B. FIG. 7H is a side view of the first lens 110. When the user adjusts the rotation buttons 723 and 724 in FIG. 7B, the first lens 110 is correspondingly rotated counterclockwise or clockwise, and the rotation of the corresponding first spherical panorama image 760 is shown in FIG. 7I. If the user has pressed the lock button 727 in the user interface 720, it indicates that no matter which of the buttons 723~726 is pressed, the first spherical panorama image 760 and the second panorama image 762 will be synchronously rotated, as shown in FIG. 7J. In an embodiment, the user may connect the image processing device to the display unit via wireless transmission, and the stitched image can be converted to an omnidirectional image or a spherical image. Additionally, the display unit may display the first image, the second image, or the stitched image.

Figure 7K:
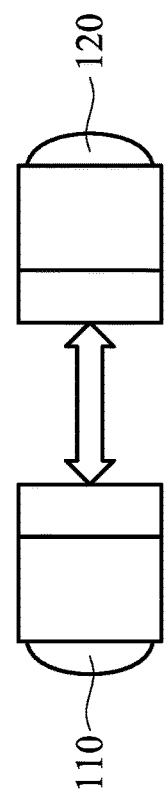
FIGS. 7K and 7L are diagrams of the user interface for adjusting distance between the lenses in accordance with an embodiment of the invention.
Figure 7L:
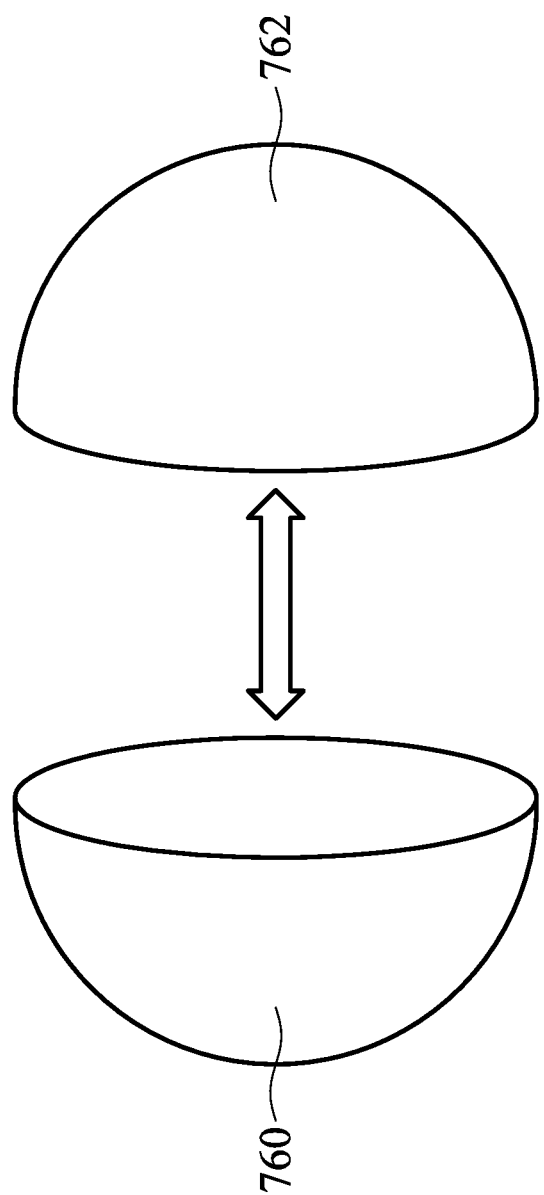

FIGS. 7K and 7L are diagrams of the user interface for adjusting distance between the lenses in accordance with an embodiment of the invention. FIG. 7K is a side view of the first lens 110 and the second lens 120. When the user adjusts the distance bar 730 of the user interface 720 in FIG. 7B, the distance between the first lens 110 and the second lens 120 will be adjusted, and the distance change between the first spherical panorama image 760 and the second spherical panorama image 762 is shown in FIG. 7L.

Referring to FIGS. 1~3 and FIG. 7B, the processor 310 may automatically determine whether the stitching points of the first spherical panorama image and the second spherical panorama image are located on the horizontal center line 215 of the housing 150. If the stitching points of the first spherical panorama image and the second spherical panorama image are not located on the horizontal center line 215 of the housing 150, the processor 310 further automatically adjusts (e.g. rotation angle, tilting angle, or distance between the first spherical panorama image and the second spherical panorama image) the first spherical panorama image and the second spherical panorama image, so that the stitching points of the adjusted first spherical panorama image and the adjusted second spherical panorama image are located on the horizontal center line 215 of the housing 150, thereby obtaining the best image stitching points. The processor may obtain the stitching points according to the offset of the first spherical panorama image and the second spherical panorama image, and the best image stitching points can be located between locations 252 and 256, and locations 250 and 254.

Specifically, the processor 310 may automatically adjust the first spherical panorama image and the second spherical panorama image, so that the stitching points of the adjusted first spherical panorama image and the adjusted second spherical panorama image are located on the horizontal center line 215 of the housing 150. The user may also manually adjust the first spherical panorama image and the second spherical panorama image via various options in the user interface 720 in FIG. 7B, such as rotation, panning, tilting, adjusting the distance, etc. To obtain the desired image effects of the stitched image, the processor 310 may also convert the stitched image into a panorama image, or a spherical image, but the invention is not limited thereto.

Figure 8A:
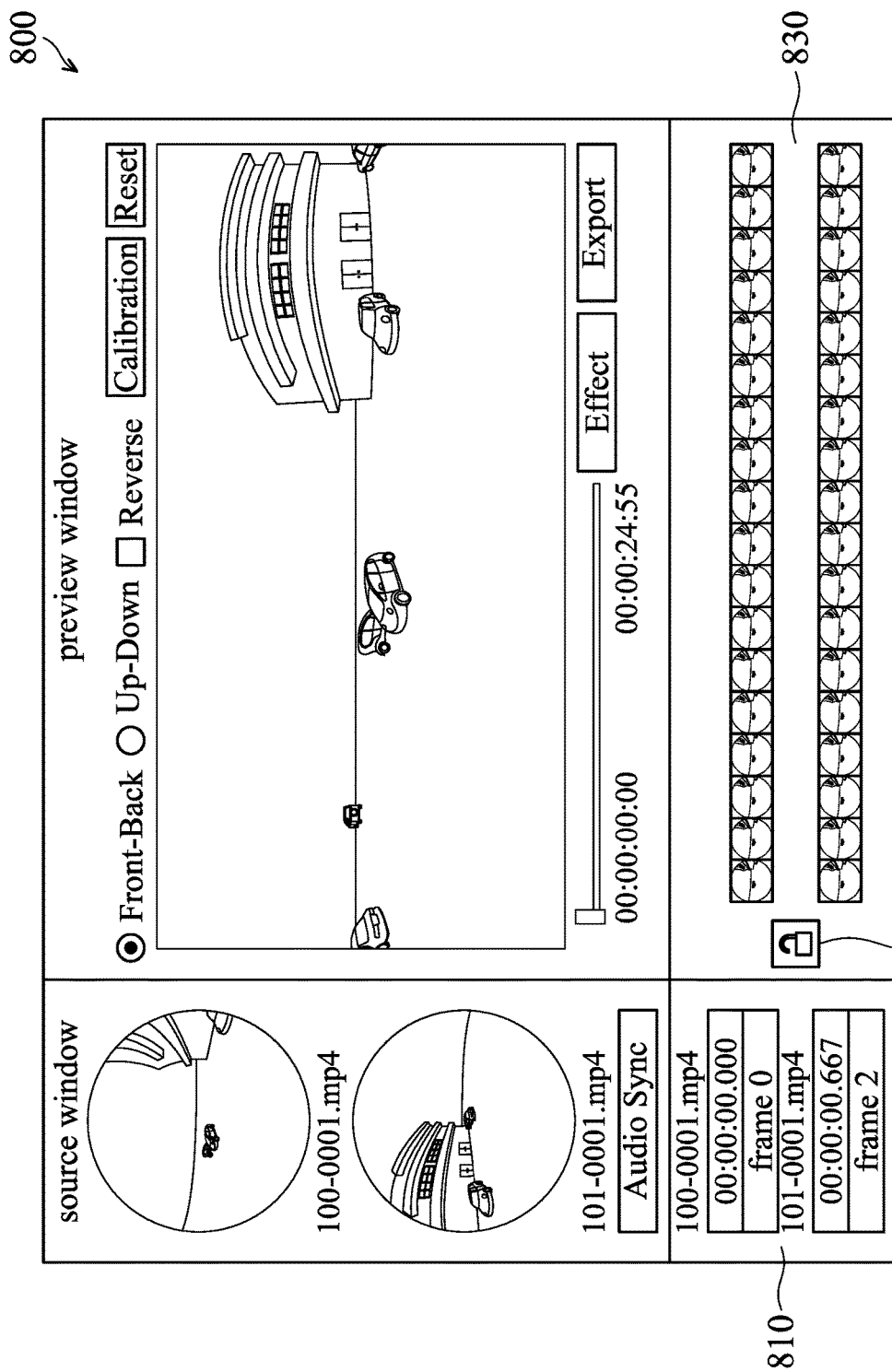
FIGS. 8A and 8B are diagrams of the user interface of the image stitching program in accordance with an embodiment of the invention.
Figure 8B:
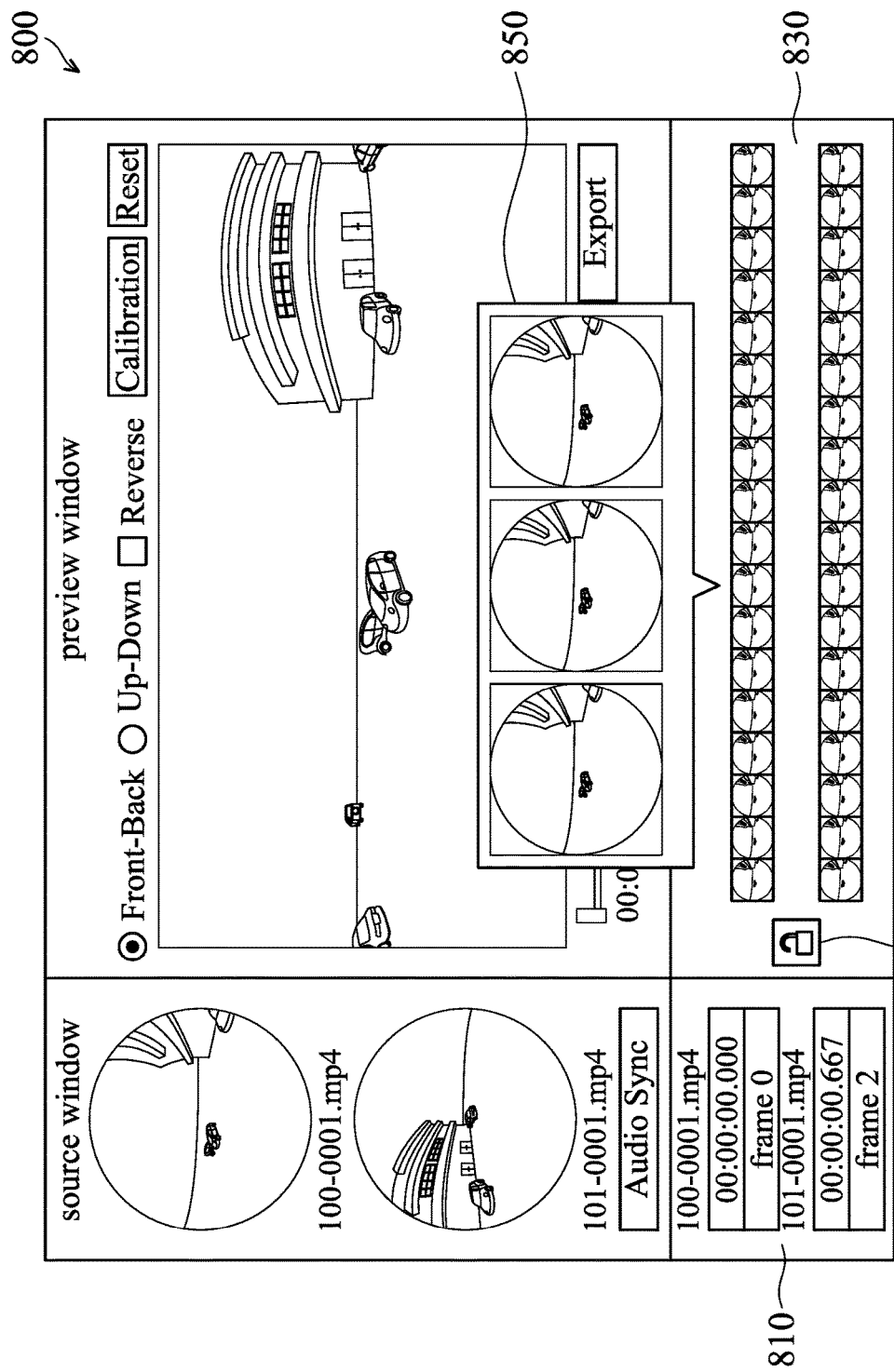

FIGS. 8A and 8B are diagrams of the user interface of the image stitching program in accordance with an embodiment of the invention. As shown in FIG. 8A, in addition to the user interface 700 in FIG. 7A, the user interface 800 further includes filenames of the first video file and the second video file, current synchronization time, and synchronized images, as shown by the information of region 810. When the lock button 820 is not pressed (i.e. unlock state), the user may manually synchronize the first video file and the second video file. When the lock button 820 is pressed (i.e. lock state), the user cannot manually synchronize the first video file and the second video file, and the image stitching program will automatically perform image synchronization, such as determining which frame to synchronize according to the delay of the audio signal. In addition, each frame in the first video file and the second video file are displayed in region 830, and the user may manually select the frame to be synchronized when the lock button 820 is not pressed (i.e. unlock state).

In view of the above, when the user has manually selected the frames to be synchronized when the lock button 820 is not pressed, the user cannot confirm the content in the selected frames due to the small size of the preview images of the selected frames. Accordingly, the image stitching program will display a pop-up window 840 to show one or more selected frames, or the selected frames and their neighboring frames, as shown in FIG. 8B. When the user has completed the aforementioned selection operation, the preview image 850 of the stitched image will be displayed on the user interface 800.

It should be noted that it is more convenient for the user to adjust parameters and image details of the stitched image of two video files via the image stitching program of the invention, thereby achieving better image effects in the stitched image (e.g. a panorama image).

Figure 9:
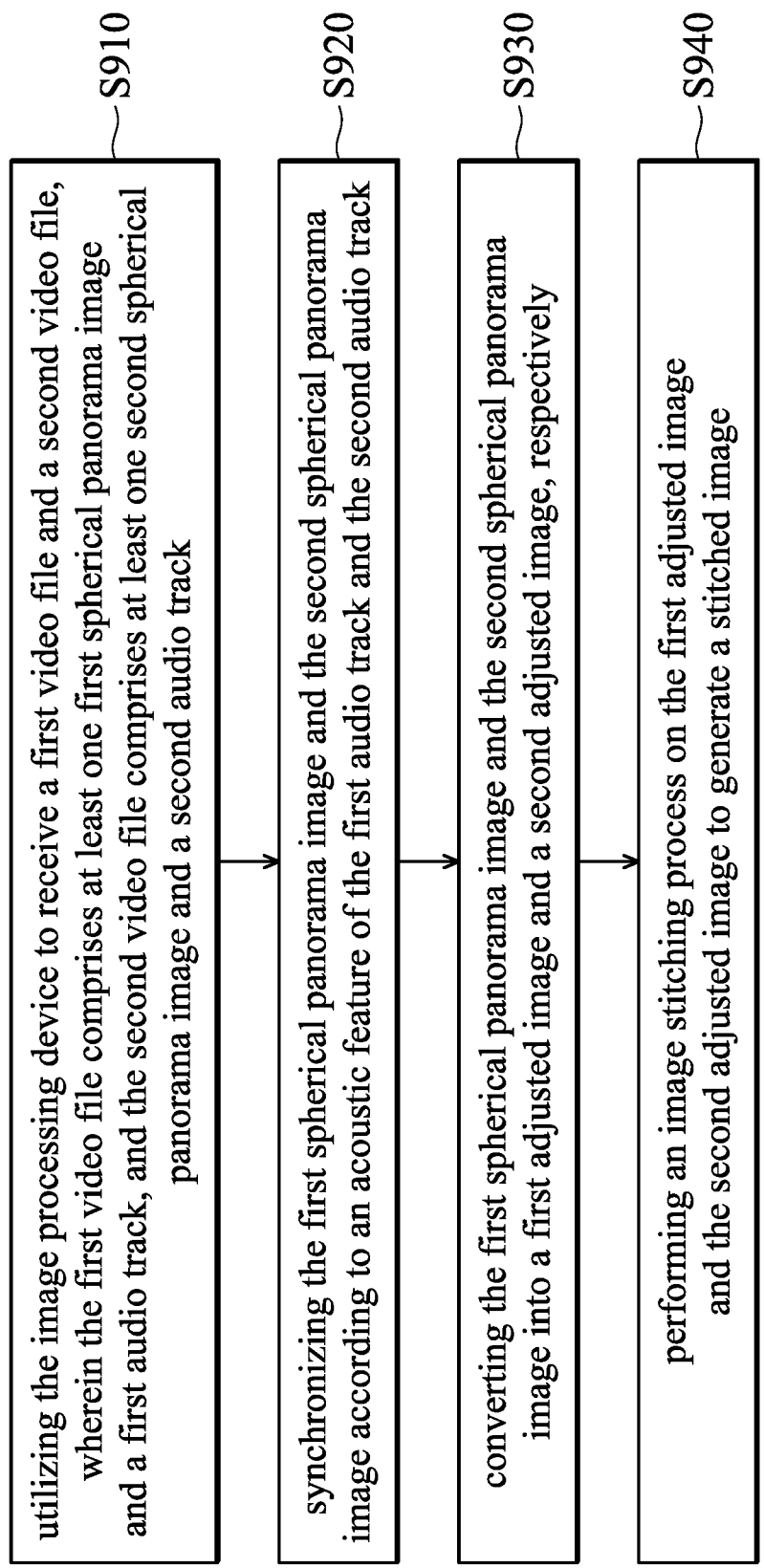
FIG. 9 is a flow chart of an image stitching method in accordance with an embodiment of the invention.

FIG. 9 is a flow chart of an image stitching method in accordance with an embodiment of the invention. In step S910, a first video file and a second video file are received from an image processing device, wherein the first video file includes at least one first spherical panorama image and a first audio track, and the second video file includes at least one second spherical panorama image and a second audio track. In step S920, the first spherical panorama image and the second spherical panorama image are synchronized according to an acoustic feature of the first audio track and the second audio track. For example, the embodiments of FIGS. 4A~4F can be referred to for details of the calculation of the acoustic feature. Different timing offsets between the first audio track and the second audio track are used to calculate corresponding comparison scores, and the timing offset that has the highest comparison score is used to synchronize the first spherical panorama image and the second spherical panorama image.

In step S930, the first spherical panorama image and the second spherical panorama image are converted into a first image and a second image, respectively. The first image and the second image are two-dimensional rectangular images. In step S940, an image stitching process is performed on the first image and the second image to generate a stitched image. It should be noted that a color compensation process can be performed before step S940 so as to obtain more natural colors, and it is also beneficial for the image stitching algorithm.

Referring to FIG. 2, when the first lens 110 and the second lens 120 are common lenses with the same field of view (e.g. the regions (angles of depression) 210 and 220 have a range of 190 degrees), the first lens 110 and the second lens 120 are not capable of capturing images having a 4K resolution (i.e. 4K image hereinafter) because the range of a 4K image is wider than the field of view of the first lens 110 and the second lens 120. Accordingly, a 4K image cannot be obtained via a single lens. If obtaining 4K images is desired, the assistance of the backside lens (i.e. lens on the opposite surface) is required. For example, the first lens 110 requires the assistance of the second lens 120 (i.e. the backside lens of the first lens 110) to obtain a 4K image.

Specifically, if it is desired that a 4K image be obtained from the first lens 110 or the second lens 120 having an angle of depression of 190 degrees, the resolution of the first lens 110 or the second lens 120 should be over 24 million pixels, and the cost of the lenses having such a high resolution is very expensive for lens manufacturing technologies nowadays. If the 4K image is stitched using the spherical images captured by the first lens 110 and the second lens 120, the diameter of the image circle of the stitched image is determined by the length of the longer side of the housing 150. As a result, a very large size of lenses is required because the angle of depression of 190 degrees is still based on the length of the shorter side of the housing 150. Accordingly, an image processing device is provided in the invention to solve the aforementioned problem with capturing 4K images.

Figure 10C:
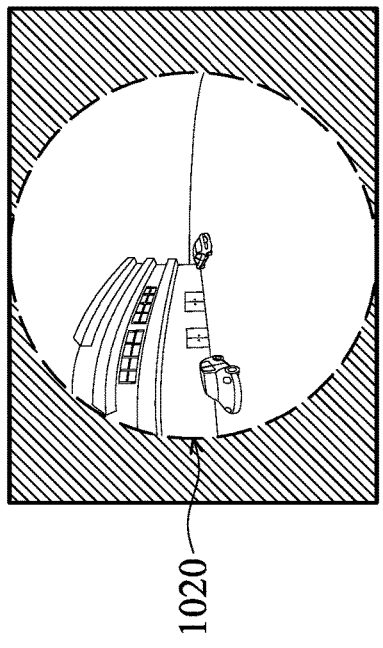
FIGS. 10B~10D are diagrams of performing an image stitching process on the first spherical panorama image and the second spherical panorama image in accordance with an embodiment of the invention.
Figure 10B:
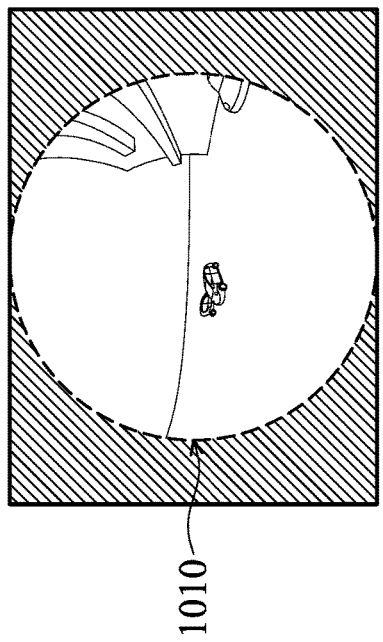
Figure 10D:
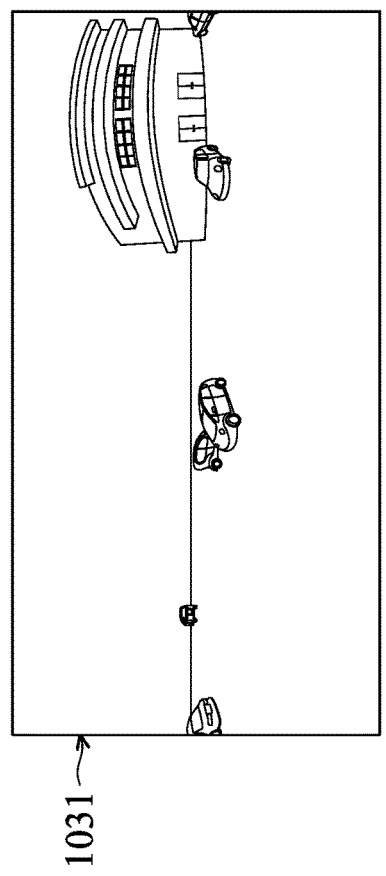

FIG. 10A is a diagram of performing image stitching by the image processing device in accordance with an embodiment of the invention. FIGS. 10B~10D are diagrams of performing an image stitching process on the first spherical panorama image and the second spherical panorama image in accordance with an embodiment of the invention.

Referring to FIG. 1 and FIG. 10A, in another embodiment, the first lens 110 and the second lens 120 in FIG. 1 are deployed on opposite surfaces of the housing 150, and the first lens 110 and the second lens 120 have different fields of view (FoV). For example, the FoV of the first lens 110 and the second lens 120 can be set to one of the predetermined FoVs such as 155 degrees, 235 degrees, and 360 degrees, but the invention is not limited thereto. In some embodiments, given that the first lens 110 and the second lens 120 are in a common resolution mode (e.g. All Round mode), the FoV of the first lens 110 can be set to an angle between 125~195 degrees, and the FoV of the second lens 120 can be set to an angle between 235±5 degrees, but the invention is not limited thereto.

For purposes of description, in FIG. 10A, the FoV of the first lens 110 is set to 155 degrees, and the FoV of the second lens 120 is set to 235 degrees. The first spherical panorama image 1010 (shown in FIG. 10B) captured by the first lens 110 and the second spherical panorama image 1020 (shown in FIG. 10C) captured by the second lens 120 are used to synthesize an omnidirectional image 1030, as shown in FIG. 10D. The method for generating a two-dimensional image 1031 by synthesizing the first spherical panorama image 1010 and the second spherical panorama image 1020 can be found in the embodiments of FIGS. 5A~5E. It should be noted that objects in the first spherical panorama image 1010 captured by the first lens 110 looks narrower and the object in the second spherical panorama image 1020 captured by the second lens 120 looks wider due to the different FoVs of the first lens 110 and the second lens 120. Thus, the resolution of the first spherical panorama image 1010 and that of the second spherical panorama image 1020 should be adjusted before performing image stitching, so that the resolution of the adjusted first spherical panorama image 1010 matches that of the adjusted second spherical panorama image 1020. It should be noted the contrast and saturation of the first spherical panorama image 1010 and the second spherical panorama image 1020 can also be adjusted while adjusting the resolution of the first spherical panorama image 1010 and the second spherical panorama image 1020, and the details can be referred to in the aforementioned embodiments.

Figure 11B:
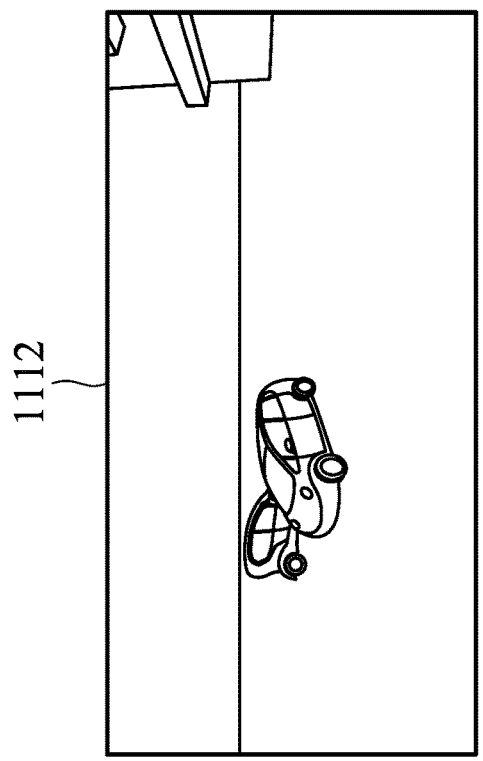
FIGS. 11A and 11B are diagrams of the first spherical panorama image and the corresponding two-dimensional image with an FoV of 155 degrees in accordance with an embodiment of the invention.
Figure 11A:
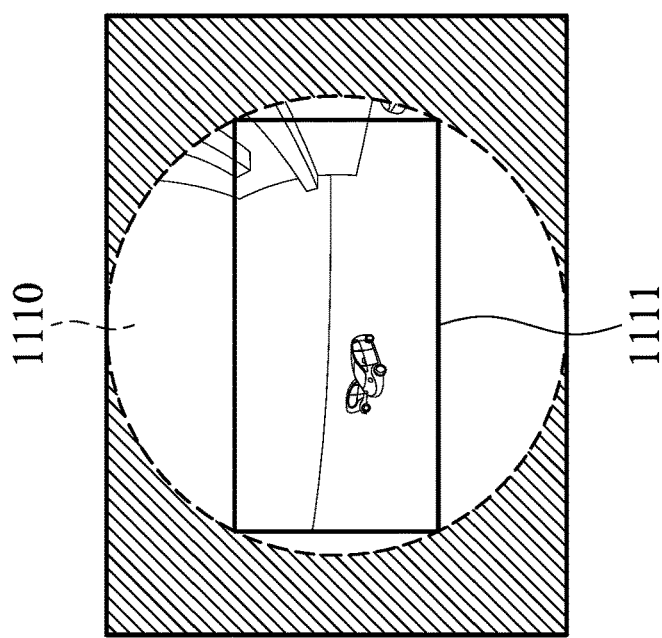
Figure 11D:
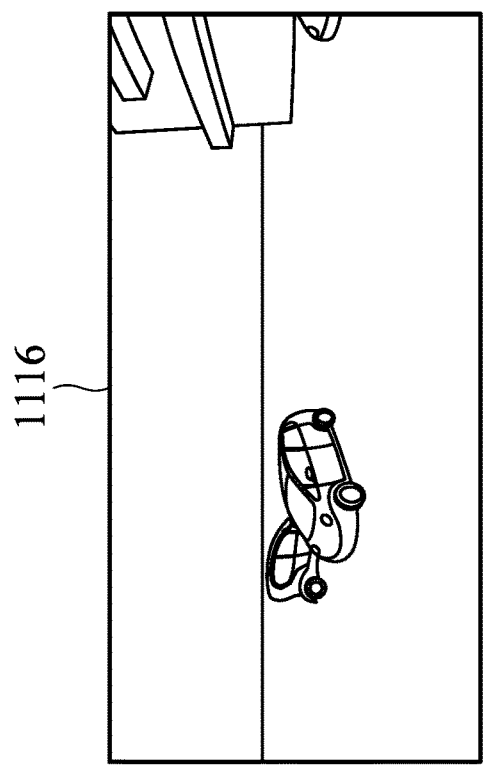
FIGS. 11C and 11D are diagrams of the third spherical panorama image and the corresponding two-dimensional image with an FoV of 188 degrees in accordance with an embodiment of the invention.
Figure 11C:
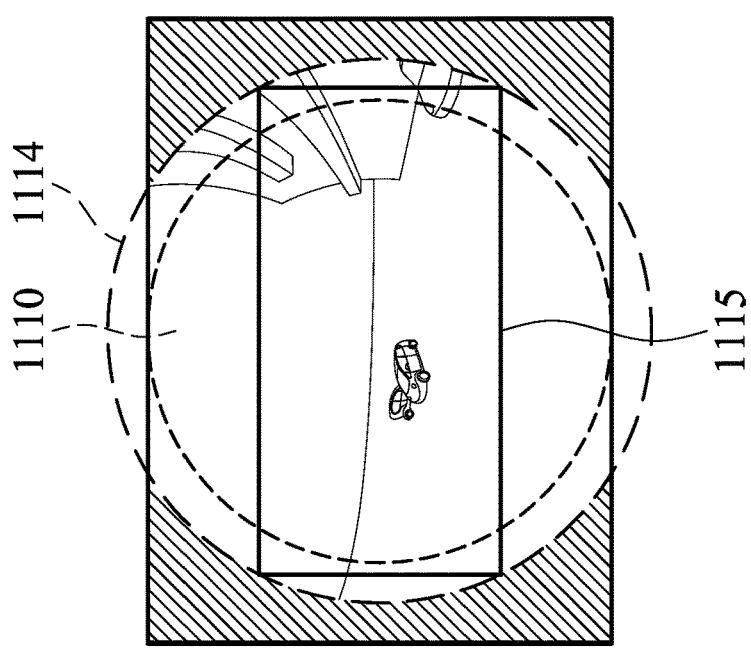
Figure 11:
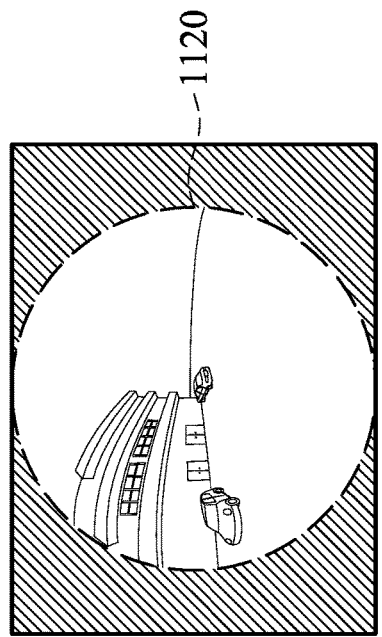
FIGS. 11E~11G are diagrams of the image stitching process in accordance with the embodiments of FIGS. 11A~11D.
FIG. 11H is a diagram of the image stitching process in accordance with the embodiments of FIGS. 11E~11G.
Figure 11:
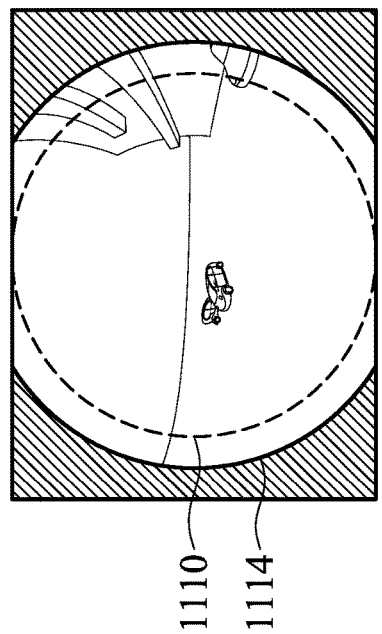
Figure 11:
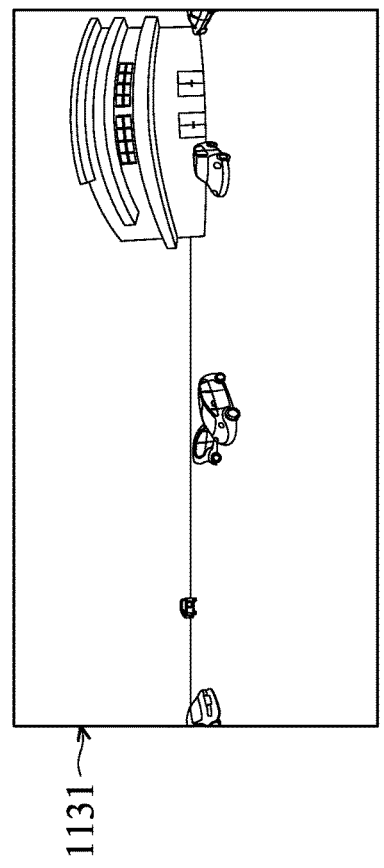

FIGS. 11A and 11B are diagrams of the first spherical panorama image and the corresponding two-dimensional image with an FoV of 155 degrees in accordance with an embodiment of the invention. FIGS. 11C and 11D are diagrams of the third spherical panorama image and the corresponding two-dimensional image with an FoV of 188 degrees in accordance with an embodiment of the invention.

In an embodiment, given that the resolution of the image sensor of the first lens 110 is 20 million pixels, a two-dimensional image 1111 having a 3K resolution can be obtained from the first spherical panorama image 1110 captured by the first lens 110 in the "front mode", as shown in FIG. 11A. In the front mode, the FoV of the first lens 110 can be extended to 188 degrees or more from 155 degrees. Since the FoV of the first lens 110 is extended, the range of the third spherical panorama image 1114 captured by the first lens 110 with an FoV of 188 degrees becomes wider. Then, a two-dimensional image 1115 having a 4K resolution can be obtained (e.g. cropped) from the third spherical panorama image 1114, as shown in FIG. 11D. It should be noted that the resolution of the image sensor of the first lens 110 is fixed at 20 million pixels no matter whether an FoV of 155 degrees or of 188 degrees is used.

Specifically, while performing image stitching, the resolution of the two-dimensional images obtained from the first spherical panorama image and from the second spherical panorama image should match each other. Since the second lens 120 captures the second spherical panorama image with an FoV of 235 degrees, a 4K image can easily be obtained from the second spherical panorama image. However, the first lens 110 captures the first spherical panorama image with an FoV of 155 degrees, a 3K image can only be obtained from the first spherical panorama image. Accordingly, the FoV of the first lens 110 is extended, so that a two-dimensional image 1115 having a 4K resolution can be obtained from the third spherical panorama image.

FIGS. 11E~11G are diagrams of the image stitching process in accordance with the embodiments of FIGS. 11A~11D.

Figure 11H:
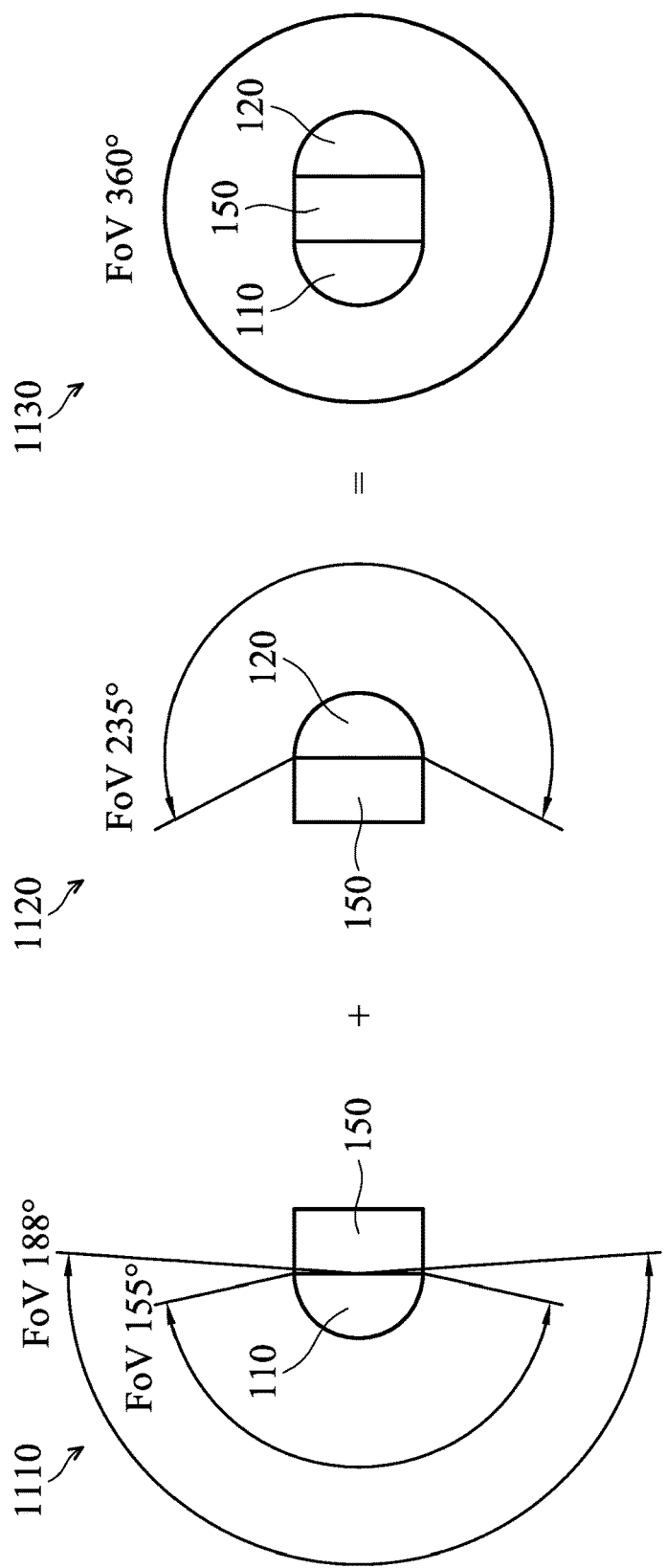

It should be noted that the third spherical panorama image 1114 covers the first spherical panorama image 1110. When performing the image stitching process, the first spherical panorama image 1110 can be obtained from the third spherical panorama image 1114, as shown in FIG. 11E. Afterwards, the resolution of the first spherical panorama image 1110 is adjusted to match that of the second spherical panorama image 1120, thereby performing the image stitching process to generate a two-dimensional image 1131, as shown in FIG. 11F and FIG. 11G. Since the first lens 110 captures the first spherical panorama image 1110 with an FoV of 155 degrees, a small-sized lens having a resolution of 20 million pixels can be used as the first lens 110 to implement 4K image capturing rather than using a large-sized lens having a resolution of 24 million pixels that is more expensive. FIG. 11H is a diagram of the image stitching process in accordance with the embodiments of FIGS. 11E~11G. It should be noted that the embodiments of FIGS. 11E~11G can be illustrated by FIG. 11H. For example, the image stitching process is performed on the first spherical panorama image 1110 and the second spherical panorama image 1120 to generate the omnidirectional image 1130 having an FoV of 360 degrees, and the omnidirectional image 1130 is usually mapped to a two-dimensional image such as the two-dimensional image 1131 in FIG. 11G.

Figure 12B:
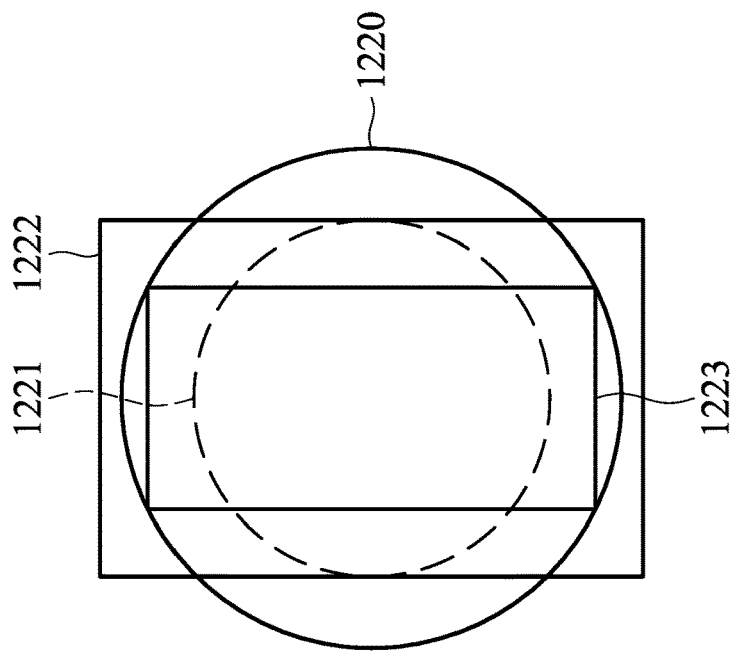
FIG. 12B is a diagram of capturing images by the second lens using different FoVs in accordance with an embodiment of the invention.
Figure 12A:
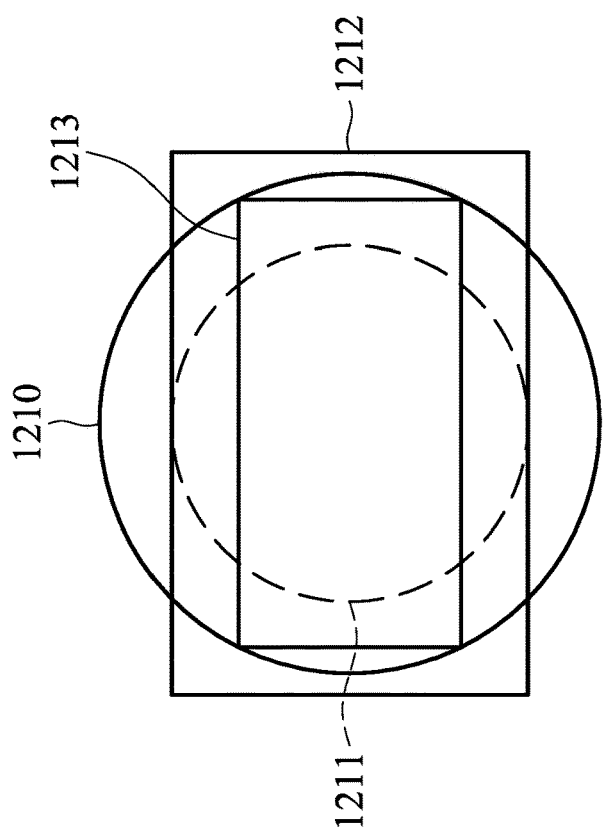
FIG. 12A is a diagram of capturing images by the first lens using different FoVs in accordance with an embodiment of the invention.

FIG. 12A is a diagram of capturing images by the first lens using different FoVs in accordance with an embodiment of the invention. FIG. 12B is a diagram of capturing images by the second lens using different FoVs in accordance with an embodiment of the invention.

In an embodiment, given that the resolution of the first lens 110 and that of the second lens 120 are 20 million pixels, it can be expressed as a rectangular image having a resolution of 5182×3888 pixels. In FIG. 12A, if the first lens 110 captures images with an FoV of 225 degrees, a spherical panorama image 1210 can be obtained. If the first lens 110 captures images with an FoV of 165 degrees, a spherical panorama image 1211 can be obtained. However, if a 4K image 1213 is desired for output, only the spherical panorama image 1210 can be used.

In FIG. 12B, if the second lens 120 captures images with an FoV of 225 degrees, the spherical panorama image 1220 can be obtained. If the second lens 120 captures images with an FoV of 165 degrees, the spherical panorama image 1221 can be obtained. However, if a 4K image 1223 is desired for output, it is clear that the range of the spherical panorama image 1221 cannot cover that of a 4K image. Then, only the spherical panorama image 1220 can be used. It should be noted that the image sensors in the first lens 110 and the second lens 120 have a rotation angle of 90 degrees in the embodiments of FIGS. 12A and 12B. For purposes of description, only the FoVs of 225 degrees and 165 degrees are used in the embodiments of FIGS. 12A and 12B. In the embodiment, the first lens 110 and the second lens 120 use the same FoV (e.g. from 125 degrees to 235 degrees) to capture images.

Figure 12D:
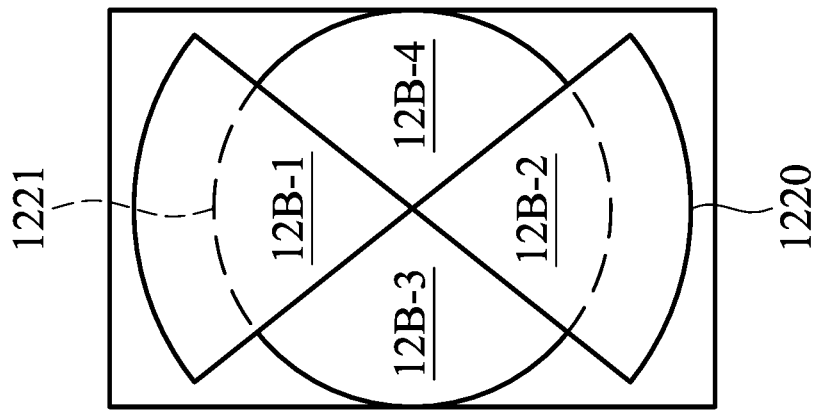
FIG. 12D is a diagram of different segments of the captured images by the first lens with different FoVs in accordance with the embodiment of FIG. 12B.
Figure 12C:
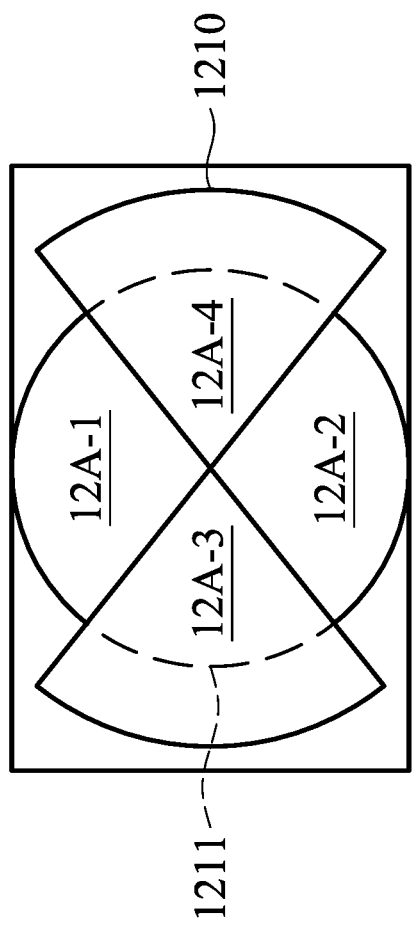
FIG. 12C is a diagram of different segments of the captured images by the first lens with different FoVs in accordance with the embodiment of FIG. 12A.

FIG. 12C is a diagram of different segments of the captured images by the first lens with different FoVs in accordance with the embodiment of FIG. 12A. FIG. 12D is a diagram of different segments of the captured images by the first lens with different FoVs in accordance with the embodiment of FIG. 12B.

Referring to FIG. 12C, the first lens 110 captures the spherical panorama images 1210 and 1211 with different FoVs, and the spherical panorama images 1210 and 1211 can be divided into four partial spherical panorama images 12A-1, 12A-2, 12A-3, and 12A-4. For example, the partial spherical panorama images 12A-1 and 12A-2 are included in the spherical panorama image 1211, and the partial spherical panorama images 12A-3 and 12A-4 are included in the spherical panorama image 1210. Similarly, referring to FIG. 12D, the second lens 120 captures the spherical panorama images 1220 and 1221 with different FoVs, and the spherical panorama images 1220 and 1221 can be divided into four partial spherical panorama images 12B-1, 12B-2, 12B-3, and 12B-4. For example, the partial spherical panorama images 12B-1 and 12B-2 are included in the spherical panorama image 1221, and the partial spherical panorama images 12B-3 and 12B-4 are included in the spherical panorama image 1220. Specifically, when performing image stitching, the partial spherical panorama images having corresponding locations should be used because the first lens 110 and the second lens 120 have an angle difference of 90 degrees and capture images with the same FoV.

For example, the partial spherical panorama image 12A-1 corresponds to the partial spherical panorama image 12B-1, and thus image stitching is performed on the partial spherical panorama images 12A-1 and 12B-1. Similarly, the partial spherical panorama image 12A-2 corresponds to the partial spherical panorama image 12B-2, and thus image stitching is performed on the partial spherical panorama images 12A-2 and 12B-2.

Similarly, the partial spherical panorama image 12A-3 corresponds to the partial spherical panorama image 12B-3, and thus image stitching is performed on the partial spherical panorama images 12A-3 and 12B-3. Similarly, the partial spherical panorama image 12A-4 corresponds to the partial spherical panorama image 12B-4, and thus image stitching is performed on the partial spherical panorama images 12A-4 and 12B-4.

Specifically, after stitching the partial spherical panorama images in each pair of corresponding locations, an omnidirectional image can be obtained and the omnidirectional image has a higher resolution in both the horizontal direction and the vertical direction. Accordingly, if a front image such as a 4:3 or 16:9 image is obtained from the omnidirectional image, a 4K resolution of the front image can be achieved easily. In addition, given that the first lens 110 and the second lens 120 has a common resolution (e.g. 20 million pixels), the output image having a higher resolution can still be obtained.

In view of the above, an image stitching method and an associated image processing device is provided in the invention, and the image stitching method and the image processing device are capable of converting spherical panorama images captured by different fisheye lenses into two-dimensional images, and performing image stitching on the two-dimensional images to obtain a two-dimensional omnidirectional image. Additionally, the image stitching program executed by the image processing device further provides various user interfaces for the user to select different image effects of the image stitching process, and the user may manually select the spherical panorama images to be synchronized, thereby achieving better image stitching effects and a better user experience.

A low-cost solution for the panorama images having a 4K resolution is also provided in the invention. For example, two lenses may capture images with different FoVs, and thus the captured spherical panorama images can be complementary with each other, so that expensive lenses having a high resolution are not required. In addition, the two lenses may use the same FoV to capture images, and the two captured spherical panorama images have an angle difference larger than 90 degrees. The two spherical panorama images can be divided into a plurality of partial spherical panorama images. After the partial spherical panorama images are converted into two-dimensional images, the two-dimensional images can be complementary in the horizontal direction and vertical direction for image stitching. Although the two lenses has a common resolution, an omnidirectional image having a higher resolution can be obtained using the image stitching method provided in the invention.

The methods, or certain aspects or portions thereof, may take the form of a program code embodied in tangible media, such as floppy diskettes, CD-ROMs, hard drives, or any other machine-readable (e.g., computer-readable) storage medium, or computer program products without limitation in external shape or form thereof, wherein, when the program code is loaded into and executed by a machine such as a computer, the machine thereby becomes an apparatus for practicing the methods. The methods may also be embodied in the form of program code transmitted over some transmission medium, such as an electrical wire or a cable, or through fiber optics, or via any other form of transmission, wherein, when the program code is received and loaded into and executed by a machine such as a computer, the machine becomes an apparatus for practicing the disclosed methods. When implemented on a general-purpose processor, the program code combines with the processor to provide a unique apparatus that operates analogously to application specific logic circuits.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An image processing device, comprising:
   a first lens;
   a second lens, wherein the first lens and the second lens respectively captures at least one first image and at least one second image, and locations of the first lens and the second lens slightly differ;
   a first microphone;
   a second microphone, wherein the first microphone and the second microphone are respectively attached on the first lens and the second lens for capturing a first audio track and a second audio track;
   a memory unit, for storing an image stitching program; and
   a processor, for executing the image stitching program to perform the steps of:
   utilizing the image processing device to receive a first video file and a second video file, wherein the first video file comprises the at least one first image and the first audio track, and the second video file comprises the at least one second image and the second audio track;
   calculating delay time between a first acoustic feature of the first audio track and a second acoustic feature of the second audio track and synchronizing the first image and the second image according to the delay time;
   converting the synchronized first image and synchronized the second image into a first adjusted image and a second adjusted image, respectively; and
   performing an image stitching process on the first adjusted image and the second adjusted image to generate a stitched image.

2. The image processing device as claimed in claim 1, wherein the stitched image comprises a stitching point located between the first image and the second image.

3. The image processing device as claimed in claim 2, wherein the first lens and the second lens are disposed on two opposite surfaces of a housing of the image processing device.

4. The image processing device as claimed in claim 3, wherein the image stitching program further provides a user interface for adjusting panning angles and tilting angles of the first image and the second image, and/or a distance between the first lens and the second lens.

5. The image processing device as claimed in claim 3, wherein the first lens captures the first image with a first field of view (FoV), and the second lens captures the second image with a second field of view, and the first field of view is different from the second field of view.

6. The image processing device as claimed in claim 3, wherein the first lens captures a third image with a first field of view, and the second lens captures the second image with a second field of view, and the first field of view is different from the second field of view.

7. The image processing device as claimed in claim 6, wherein the processor further crops the first image associated with a third field of view from the third image, and the third field of view is smaller than the first field of view.

8. The image processing device as claimed in claim 3, wherein the first lens captures the first image with a first field of view, and the second lens captures the second image with a second field of view, and the first field of view is equal to the second field of view.

9. The image processing device as claimed in claim 8, wherein there is an angle difference larger than 90 degrees between centerlines of the first image and the second image, and the first image is divided into a plurality of first partial images, and the second image is divided into a plurality of second partial images, and each first partial image corresponds to each second partial image at the same location,
wherein the processor performs the image stitching process on each first partial image and each corresponding second partial image to generate the stitched image.

10. The image processing device as claimed in claim 2, wherein the processor further automatically adjusts the first image and the second image, so that a stitching point of the first image and the second image is located on a horizontal center line of a housing of the image processing device.

11. The image processing device as claimed in claim 1, wherein the processor stitches a right half portion of the second image with a left side of the first image, and stitches a left half portion of the second image with a right side of the first image, thereby generating the stitched image.

12. The image processing device as claimed in claim 11, wherein the processor further performs a color compensation process on the first image and the second image, and performs the image stitching process on the color-compensated first image and second image.

13. The image processing device as claimed in claim 1, wherein the processor further selects the first audio track or the second audio track accompanying the stitched image, and the processor further converts the stitched image to an omnidirectional image or a spherical image.

14. The image processing device as claimed in claim 1, further comprising:
a display unit, connecting to the image processing device via wireless transmission;
wherein the first image and the second image are omnidirectional images or spherical images, and the display unit is capable of displaying the first image, the second image, or the stitched image.

15. An image processing device, comprising:
a first lens, capturing a first image with a first field of view;
a second lens, capturing a second image with a second field of view, wherein the first field of view is different from the second field of view, wherein the first lens and the second lens respectively captures at least one first image and at least one second image, and locations of the first lens and the second lens slightly differ;
a first microphone;
a second microphone, wherein the first microphone and the second microphone are respectively attached on the first lens and the second lens for capturing a first audio track and a second audio track;
a memory unit, for storing a memory stitching program;
a processor, for executing the image stitching program to perform the steps of:
utilizing the image processing device to receive a first video file and a second video file, wherein the first video file comprises the at least one first image and the first audio track, and the second video file comprises the at least one second image and the second audio track;
calculating delay time between a first acoustic feature of the first audio track and a second acoustic feature of the second audio track and synchronizing the first image and the second image according to the delay time;
converting the synchronized first image and the synchronized second image into a first adjusted image and a second adjusted image, respectively; and
performing an image stitching process on the first adjusted image and the second adjusted image to generate a stitched image.

16. An image processing device, comprising:
a first lens, capturing a first image with a first field of view;
a second lens, capturing a second image with a second field of view, wherein the first field of view is different from or equal to the second field of view;
a memory unit, for storing a memory stitching program;
a processor, for executing the image stitching program to perform the steps of:
utilizing the image processing device to receive a first video file and a second video file, wherein the first video file comprises at least one first image, and the second video file comprises at least one second image;
converting the first image and the second image into a first adjusted image and a second adjusted image, respectively; and
performing an image stitching process on the first adjusted image and the second adjusted image to generate a stitched image,
wherein the first lens captures a third image with the first field of view, and the processor crops the first image associated with a third field of view from the third image, and the third field of view is smaller than the first field of view.

17. The image processing device as claimed in claim 16, wherein there is a rotation angle of 90 degrees between a first image sensor in the first lens and a second image sensor in the second lens,
wherein when the first field of view is equal to the second field of view, and there is an angle difference larger than 90 degrees between centerlines of the first image and the second image, and the first image is divided into a plurality of first partial images, and the second image is divided into a plurality of second partial images, and each first partial image corresponds to each second partial image at the same location,
wherein the processor performs the image stitching process on each first partial image and each corresponding second partial image to generate the stitched image.

* * * * *